(12) United States Patent
Rosca et al.

(10) Patent No.: US 9,615,172 B2
(45) Date of Patent: Apr. 4, 2017

(54) BROADBAND SENSOR LOCATION SELECTION USING CONVEX OPTIMIZATION IN VERY LARGE SCALE ARRAYS

(71) Applicants: Siemens Aktiengesellschaft, Munich (DE); University of Maryland, College Park, MD (US)

(72) Inventors: Justinian Rosca, West Windsor, NJ (US); Heiko Claussen, North Brunswick, NJ (US); Radu Victor Balan, Rockville, MD (US); Yenming Lai, College Park, MD (US)

(73) Assignees: Siemens Aktiengesellschaft, Munich (DE); University of Maryland, College Park, MD (US)

( * ) Notice: Subject to any disclaimer, the term of this patent is extended or adjusted under 35 U.S.C. 154(b) by 192 days.

(21) Appl. No.: 14/318,733

(22) Filed: Jun. 30, 2014

(65) Prior Publication Data

US 2014/0314251 A1 Oct. 23, 2014

Related U.S. Application Data

(63) Continuation-in-part of application No. 13/644,432, filed on Oct. 4, 2012, now Pat. No. 9,264,799.

(Continued)

(51) Int. Cl.
| | |
|---|---|
| H04R 3/00 | (2006.01) |
| H04R 1/40 | (2006.01) |
| H04M 3/56 | (2006.01) |
| G10L 21/0216 | (2013.01) |
| G10L 25/48 | (2013.01) |
| H04R 25/00 | (2006.01) |

(52) U.S. Cl.
CPC ............ *H04R 3/005* (2013.01); *H04R 1/406* (2013.01); *G10L 25/48* (2013.01);
(Continued)

(58) Field of Classification Search
USPC .......................................... 381/313, 387, 356
See application file for complete search history.

(56) References Cited

U.S. PATENT DOCUMENTS

| | | | | |
|---|---|---|---|---|
| 5,045,860 A | * | 9/1991 | Hodson ..................... | G01S 5/04 342/451 |
| 8,213,263 B2 | * | 7/2012 | Kim ..................... | G01S 3/8083 181/125 |

(Continued)

OTHER PUBLICATIONS

Ward et al, Grid based beamformer design for room environment microphone arrays, IEEE, 1999.*

(Continued)

*Primary Examiner* — Davetta W Goins
*Assistant Examiner* — Kuassi Ganmavo

(57) ABSTRACT

Systems and methods are provided to determine a subset of D microphones in a set of N microphones on a perimeter of a space to monitor a target location. The space is divided into L interference locations. An equation is solved to determine microphone weights for the N microphones by minimizing the maximum gain for signals related to the target location and interference locations, further optimized over an $l^1$ penalty by applying a Lagrange multiplier to an $l^1$ norm of the microphone weights in a manner that determines a set of D non-zero microphones weights and a set of (N-D) microphone weights that are zero or close to zero. Microphone weights are determined for at least 2 different frequencies.

20 Claims, 14 Drawing Sheets

Related U.S. Application Data

(60) Provisional application No. 61/888,550, filed on Oct. 9, 2013.

(52) U.S. Cl.
CPC ... *G10L 2021/02166* (2013.01); *H04M 3/568* (2013.01); *H04M 2203/509* (2013.01); *H04R 25/405* (2013.01); *H04R 25/407* (2013.01); *H04R 2225/41* (2013.01); *H04R 2225/43* (2013.01); *H04R 2430/03* (2013.01); *H04R 2430/23* (2013.01)

(56) References Cited

U.S. PATENT DOCUMENTS

| | | | | |
|---|---|---|---|---|
| 2003/0053639 | A1* | 3/2003 | Beaucoup | G10L 21/0208 381/92 |
| 2005/0094795 | A1* | 5/2005 | Rambo | H04M 9/10 379/202.01 |
| 2007/0223310 | A1* | 9/2007 | Tran | G01V 1/003 367/77 |
| 2009/0268555 | A1* | 10/2009 | Underbrink | G10L 21/0272 367/135 |
| 2010/0092207 | A1* | 4/2010 | Ito | G03G 15/0894 399/109 |
| 2013/0332065 | A1* | 12/2013 | Hakim | H04W 64/00 701/411 |
| 2014/0313859 | A1* | 10/2014 | Hald | G10K 11/346 367/138 |

OTHER PUBLICATIONS

Anand et al, Experimental Performance Analysis of sound detection with SRP PHAT, IEEE, 2009.*
Bach et al, Optimization with sparsity inducing penalties, 2010.*
Gertoft et al, Improving beampatterns of two dimensional arrays using convex optimization, 2011.*
Yan et al, Convex Optimization based time domain broadband beamforming with sidelobe control, ASA, 2007.*
Yardibi et al, A covariance fitting approach for correlated acoustic source mapping, ASA, 2010.*
Cen et al, Linear sparse array synthesis via convex optimization, IEEE, 2010.*
Ryan et al, Optimum near field performance of microphone arrays subject to a farfield beampattern constraint, 1999.*
M. S. Lobo, L. Vandenberghe, S. Boyd, and H. Lebret, 8220;Applications of second-order cone programming, 8221; Linear algebra and its applications, vol. 284, No. 1, pp. 193 211;228, 1998.
S. Kirkpatrick and MP Vecchi, 8220;Optimization by simulated annealing, 8221; science, vol. 220, No. 4598, pp. 671 8211;680, 1983.
E.J. Candes and Y. Plan, 8220;Near-ideal model selection by l1 minimization, 8221; Annals of Statistics, vol. 37, No. 5A, pp. 2145 8211;2177, 2009.
R. Tibshirani, 8220;Regression shrinkage and selection via the lasso, 8221; Journal of the Royal Statistical Society (Series B), vol. 58, pp. 267 8211;288, 1996.
Alexander Bertrand and Marc Moonen, 8220;Efficient sensor subset selection and link failure response for linear mmse signal estimation in wireless sensor networks, 8221; in Proc. of the European signal processing conference (EUSIPCO), 2010, pp. 1092 8211;1096.
E. J. Candes and M. Wakin, 8220;An introduction to compressive sampling, 8221; IEEE Signal Processing Magazine, vol. 25, No. 2, pp. 21 8211;30, 2008.
J.B. Allen and D.A. Berkley, 8220;Image method for efficiently simulating small-room acoustics, 8221; J. Acoust. Soc. Am, vol. 65, No. 4, pp. 943 8211;950, 1979.

* cited by examiner

○ = Active Microphone(s)

= Pass Region

= Rejection Region o = Active Microphone(s)

= Pass Region

= Rejection Region

FIG. 6

Results after scan applying masks
H = high
L = low
VL= very low

BROADBAND SENSOR LOCATION SELECTION USING CONVEX OPTIMIZATION IN VERY LARGE SCALE ARRAYS

CROSS REFERENCE TO RELATED APPLICATIONS

The present application is a continuation-in-part and claims the benefit of U.S. patent application Ser. No. 13/644,432 filed on Oct. 4, 2012 which is incorporated herein by reference in its entirety. The present application also claims the benefit of U.S. Provisional Patent Application Ser. No. 61/888,550 filed on Oct. 9, 2013, which is incorporated by reference herein in its entirety.

GOVERNMENT INTERESTS

This invention was made with government support under contract number DMS-1109498 awarded by the National Science Foundation (NSF). The U.S. Government has certain rights in the claimed inventions.

BACKGROUND OF THE INVENTION

The present invention relates generally to locating, extracting and tracking acoustic sources in an acoustic environment and mapping of the acoustic environment by adaptively employing a very large number of microphones.

Acoustic scene understanding is challenging for complex environments with e.g, multiple sources, correlated sources, non-punctual sources, mixed far field and near field sources, reflections, shadowing from objects. The use of ultra large arrays of microphones to acoustically monitor a 3D space has significant advantages. It allows improving source recognition and source separation, for instance. Though methods exist to focus a plurality of microphones on acoustic sources, it is believed that no methods exist for source tracking and environmental acoustic mapping that use ultra large sets (>1020) of microphones from which adaptively subsets of microphones are selected and signals are processed adaptively.

Accordingly, novel and improved methods and apparatus to apply ultra large (>1020) microphone arrays and to select an appropriate subset of microphones from an very large (below or above 1020) set of microphones and to adaptively process microphone data generated by an ultra large array of microphones to analyze an acoustic scene are required.

SUMMARY OF THE INVENTION

Aspects of the present invention provide systems and methods to perform detection and/or tracking of one or more acoustic sources in an environment monitored by a microphone array by arranging the environment in a plurality of pass region masks and related complementary rejection region masks, each pass region mask being related to a subset of the array of microphones, and each subset being related with a beamforming filter that maximizes the gain of the pass region mask and minimizes the gain for the complementary rejection masks, and wherein signal processing for a pass mask includes the processing of only signals generated by the microphones in the subset of microphones. In accordance with a further aspect of the present invention a method is provided to create an acoustic map of an environment having an acoustic source, comprising: a processor determining a plurality of spatial masks covering the environment, each mask defining a different pass region for a signal and a plurality of complementary rejection regions, wherein the environment is monitored by a plurality of microphones, the processor determining for each mask in the plurality of spatial masks a subset of microphones in the plurality of microphones and a beamforming filter for each of the microphones in the subset of microphones that maximizes a gain for the pass region and minimizes gain for the complementary rejection regions associated with each mask according to an optimization criterion that does not at least initially depend on the acoustic source in the environment; and the processor applying the plurality of spatial masks in a scanning action across the environment on signals generated by microphones in the plurality of microphones to detect the acoustic source and its location in the environment.

In accordance with an aspect of the present invention, a method for monitoring an acoustic target in a target location in a space monitored by N microphones is provided, comprising: providing a number D equal to or greater than 2 and smaller than N to a processor, providing a number of L locations in the space, wherein each location in the L locations is treated by a processor as an interference source, determining by the processor a set of D microphones from the set of N microphones, including the steps: minimizing a maximum interference gain relative to the target location and the L interference locations over at least 2 different frequencies expressed in microphone weights for all N microphones, and performing a convex optimization of the microphone weights for all N microphones over an $l^1$ penalty to determine a set of D microphone weights not equal to zero for each of the at least 2 frequencies.

In accordance with a further aspect of the present invention, a method is provided, wherein the same set of D microphones is applied to each of the at least 2 frequencies.

In accordance with yet a further aspect of the present invention, a method is provided, wherein the microphones are sampled selectively over the space-frequency domain and at least two different sets of D microphones are determined.

In accordance with yet a further aspect of the present invention, a method is provided, wherein the $l^1$ penalty includes applying a Lagrange multiplier in an $l^1$ norm of the microphone weights of the N microphones.

In accordance with yet a further aspect of the present invention, a method is provided, wherein an expression is evaluated that includes a transfer function for the at least 2 frequencies between each of the N sensors and each of the L interferences and the $l^1$ penalty with a value of the Lagrange multiplier to determine a first set of microphone weights.

In accordance with yet a further aspect of the present invention, a method is provided, wherein the expression is evaluated for different values of the Lagrange multiplier until the first set of microphone weights has D non-zero sensor weights and (N−D) microphone weight in the first set of microphone weights are at least a factor 10 smaller than a $D^{th}$ microphone weight.

In accordance with yet a further aspect of the present invention, a method is provided, wherein a final set of microphone weights is determined from the first set of microphone weights by debiasing the expression by setting the value of the Lagrange multiplier to zero.

In accordance with yet a further aspect of the present invention, a method is provided, wherein a perimeter of the space is surrounded by the set of N microphones.

In accordance with yet a further aspect of the present invention, a method is provided, further comprising determining microphone weights for a plurality of target locations to determine a strength of a signal in each of the plurality of target locations.

In accordance with yet a further aspect of the present invention, a method is provided, wherein, the expression is provided by:

$$\min_{(w_n(f_i))_{i=1,n=1}^{F,N}} \max_{1 \le l \le L} \sum_{i=1}^{F} \left| \sum_{n=1}^{N} H_{ln}(f_i) w_n(f_i) \right| + \lambda \sum_{n=1}^{N} \max_{1 \le i \le F} |w_n(f_i)|$$

subject to:

$$\sum_{n=1}^{N} H_{0n}(f_i) w_n(f_i) = 1 \text{ for } i = 1, 2, \ldots, F,$$

wherein
i is an index of one of F frequencies,
n is an index of one of N microphones,
l is an index of one of L interferences,
$f_i$ indicates a frequency of index i,
$H_{ln}$ indicates a transfer function between a source with index l and a microphone with index n,
$w_n(f_i)$ indicates a weight of microphone n for frequency $f_i$, and
$\lambda$ is the Lagrange multiplier.

In accordance with another aspect of the present invention, a system to monitor an acoustic target in a target location in a space monitored by N microphones is provided, comprising: a memory enabled to store data including instructions, a processor, enabled to retrieve and execute instructions from the memory to perform the steps: accepting a number D equal to or greater than 2 and smaller than N; accepting a number of L locations in the space, wherein each location in the L locations is treated as an interference source; determining a set of D microphones from the set of N microphones, including the steps: minimizing a maximum interference gain relative to the target location and the L interference locations over at least 2 different frequencies expressed in microphone weights for all N microphones; and performing a convex optimization of the microphone weights for all N microphones over an $l^1$ penalty to determine a set of D microphone weights not equal to zero for each of the at least 2 frequencies.

In accordance with yet another aspect of the present invention, a system is provided, wherein the same set of D microphones is applied to each of the at least 2 frequencies.

In accordance with yet another aspect of the present invention, a system is provided, wherein the microphones are sampled selectively over the space-frequency domain and at least two different sets of D microphones are determined.

In accordance with yet another aspect of the present invention, a system is provided, wherein the $l^1$ penalty includes applying a Lagrange multiplier in an $l^1$ norm of the microphone weight of the N microphones.

In accordance with yet another aspect of the present invention, a system is provided, wherein an expression is evaluated that includes a transfer function for the at least 2 frequencies between each of the N sensors and each of the L interferences and the $l^1$ penalty with a value of the Lagrange multiplier to determine a first set of microphone weights.

In accordance with yet another aspect of the present invention, a system is provided, wherein the expression is evaluated for different values of the Lagrange multiplier until the first set of microphone weights has D non-zero sensor weights and (N–D) microphone weight in the first set of microphone weights are at least a factor 10 smaller than a $D^{th}$ microphone weight.

In accordance with yet another aspect of the present invention, a system is provided, wherein a final set of microphone weights is determined from the first set of microphone weights by debiasing the expression by setting the value of the Lagrange multiplier to zero.

In accordance with yet another aspect of the present invention, a system is provided, wherein a perimeter of the space is surrounded by the set of N microphones.

In accordance with yet another aspect of the present invention, a system is provided, further comprising the processor determining microphone weights for a plurality of target locations to determine a strength of a signal in each of the plurality of target locations.

In accordance with yet another aspect of the present invention, a system is provided, wherein the expression is provided by:

$$\min_{(w_n(f_i))_{i=1,n=1}^{F,N}} \max_{1 \le l \le L} \sum_{i=1}^{F} \left| \sum_{n=1}^{N} H_{ln}(f_i) w_n(f_i) \right| + \lambda \sum_{n=1}^{N} \max_{1 \le i \le F} |w_n(f_i)|$$

subject to:

$$\sum_{n=1}^{N} H_{0n}(f_i) w_n(f_i) = 1 \text{ for } i = 1, 2, \ldots, F,$$

wherein
i is an index of one of F frequencies,
n is an index of one of N microphones,
l is an index of one of L interferences,
$f_i$ indicates a frequency of index i,
$H_{ln}$ indicates a transfer function between a source with index l and a microphone with index n,
$w_n(f_i)$ indicates a weight of microphone n for frequency $f_i$, and
$\lambda$ is the Lagrange multiplier.

BRIEF DESCRIPTION OF THE DRAWINGS

FIG. 6 illustrates a detection result by applying one or more steps in accordance with various aspects of the present invention;

DETAILED DESCRIPTION

Figure 1:
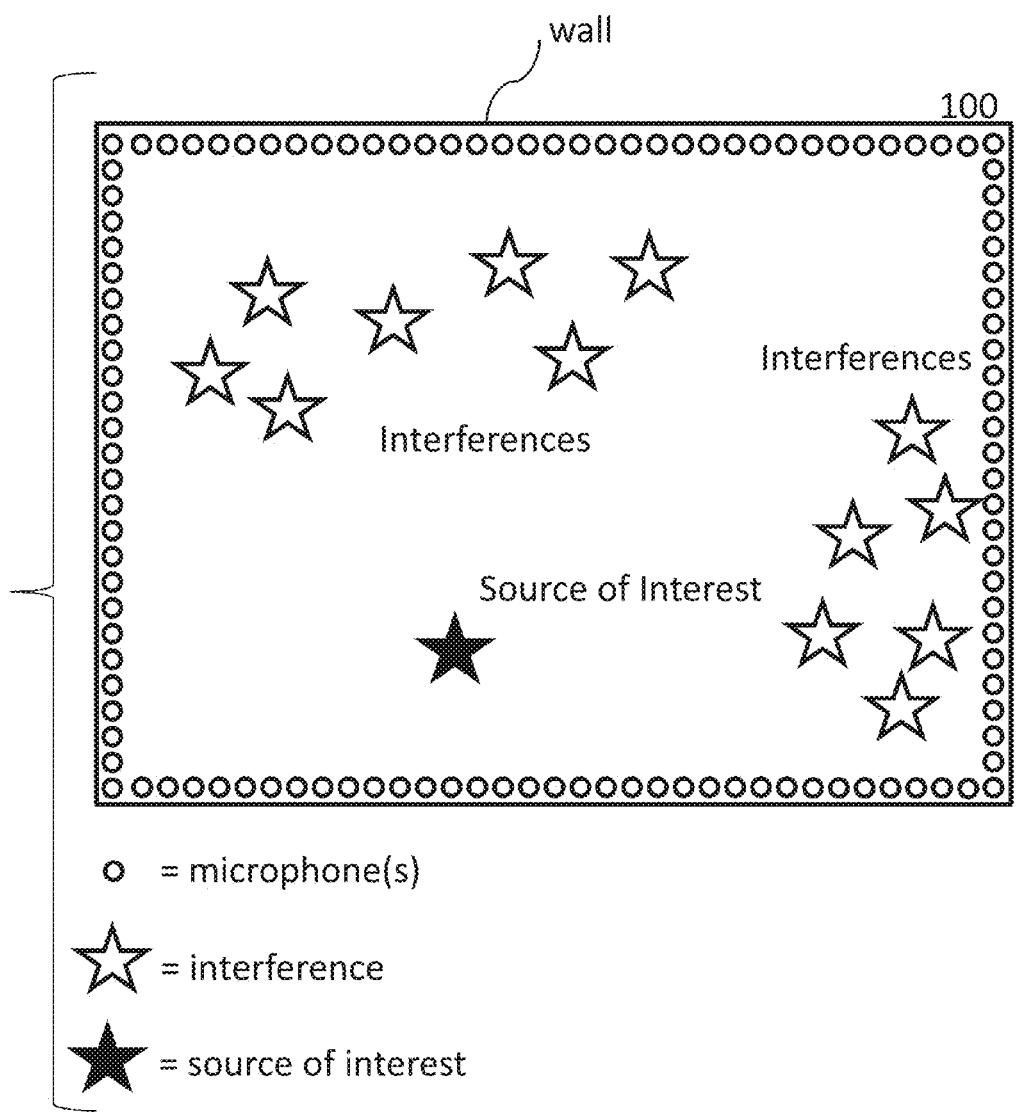
FIG. 1 illustrates a scenario of interest in accordance with various aspects of the present invention.

One issue that is addressed herein in accordance with an aspect of the present invention is acoustic scene understanding by applying an ultra large array of microphones. The subject of acoustic scene understanding has been addressed in a different way in commonly owned U.S. Pat. No. 7,149,691 to Balan et al., issued on Dec. 12, 2006, which is incorporated herein by reference, wherein ultra large microphones are not applied.

In the current approach a number of high level processes are assumed:
(1) Localization of acoustic sources in the environment, representing both targets and interferences, and further source classification;
(2) Tracking of features of the sources or even separation of target sources of interest;
(3) Mapping the environment configuration such as location of walls and determination of room layout and obstacles.

A target herein is a source of interest. A target may have a specific location or certain acoustic properties that makes it of interest. An interference herein is any acoustic source that is not of interest to be analyzed. It may differ from a target by its location or its acoustic signature. Because the interference is not of interest, it will be treated as undesired and will be ignored if that is possible or it will be suppressed as much as possible during processing.

Acoustic radars have been used in the nineteen hundreds and the twentieth century, for instance for source localization and tracking, and later abandoned in favor of the electromagnetic radar.

In accordance with an aspect of the present invention the extraction and tracking of acoustic features of entire sources are pursued, while mapping the acoustic environment surrounding a source. This may include pitch of a speaker's voice, energy pattern in the time-frequency domain of a machine and the like. This approach goes beyond the idea of an acoustic radar.

A limited number of sensors offer little hope with the present state of the art sound technology to completely map a complex acoustic environment e.g., which contains a large number of correlated sources. One goal of the present invention is to adaptively employ a large set of microphones distributed spatially in the acoustic environment which may be a volume of interest. Intelligent processing of data from a large set of microphones will necessarily involve definition of subsets of microphones suitable to scan the audio field and estimate targets of interest.

One scenario that applies various aspects of the present invention may include the following constraints: a) The acoustic environment is a realistic and real acoustic environment (characterized by reflections, reverberation, and diffuse noise); b) the acoustic environment overlaps and mixes large number of sources e.g. 20-50; c) possibly a smaller number of sources of interest exist, e.g. 1-10, while the others represent mutual interferences and noise. One goal is to sense the acoustic environment with a large microphone set, e.g., containing 1000 or more microphones or containing over 1020 or over 1030 microphones, at a sufficient spatial density to deal with the appropriate number of sources, amount of noise, and wavelengths of interest.

An example scenario is illustrated in FIG. 1. FIG. 1 illustrates a space 100 with a number of acoustic interferences and at least one acoustic source of interest. One application in accordance with an embodiment of the present invention is where a fixed number of sources in a room are known and the system monitors if some other source enters the room or appears in the room. This is useful in a surveillance scenario. In that case all locations that are not interferences are defined as source locations of interest.

An acoustic source generates an acoustic signal characterized by a location in a space from which it emanates acoustic signals with spectral and directional properties which may change over time.

Regarding interferences, all sources are interferences from the point of each other. Thus, all interferences are also sources, be it unwanted sources. That is, if there are two sources A and B and if one wants to listen to source A then source B is considered to be an interference and if one wants to listen to source B then source A is an interference. Also, sources and interferences can be defined if it is known what it is that is listened to or what is considered to be a disturbance. For example, if there are people talking in an engine room and one is interested in the signals from the conversation it is known what features speech has (sparse in the time frequency content, pitch and resonances at certain frequencies etc.). It is also known that machines in general generate a signal with a static spectral content. A processor can be programmed to search for these characteristics and classify each source as either "source" or as "interference".

The space 100 in FIG. 1 is monitored by a plurality of microphones which preferably are hundreds of microphones, more preferably thousand or more microphones and most preferably over 1020 microphones. The microphones in this example are placed along a wall of a space and are uniformly distributed along the wall. An optimal microphone spacing is dependent on frequencies of the sources and the optimal microphone location is dependent on the unknown source locations. Also, there may be practical constraints in each application (e.g., it is not possible to put microphones in certain locations or there might be wiring problems). In one embodiment of the present invention a uniform distribution of microphones in a space is applied, for instance around the walls of a space such as a room. In one embodiment of the present invention microphones are arranged in a random fashion on either the walls or in 2D on the ceiling or floor of the room. In one embodiment of the present invention microphones are arranged in a logarithmic setup on either the walls or in 2D on the ceiling or floor of the room.

It may be difficult to sample all microphones simultaneously as such an endeavor would generate a huge amount of data, which with over 1000 or over 1020 microphones appears computationally infeasible to take place in real-time.

Next steps that are performed in accordance with various aspects of the present invention are: to (1) localize sources and interferences, (2) to select a subset from the large number of microphones that best represent the scene and (3) to find weight vectors for beam pattern that best enable the extraction of the sources of interest while disregarding the interferences.

Acoustic scene understanding is challenging for complex environments with e.g., multiple sources, correlated sources, large/area sources, mixed far field and near field sources, reflections, shadowing from objects etc. When extracting and evaluating a single source from the scene, all other sources are considered interferers. However, reliable feature extraction and classification relies on good signal-to-noise or SNRs (e.g., larger then 0 dB). This SNR challenge can be addressed by using beamforming with microphone arrays. For the far field case, the SNR of the target source increases linearly with the number of microphones in the array as described in "[1] E. Weinstein, K. Steele, A. Agarwal, and J. Glass, LOUD: A 1020-Node Microphone Array and Acoustic Beamformer. International congress on sound and vibration (ICSV), 2007."

Therefore, microphone arrays enable high system performance in challenging environments as required for acoustic scene understanding. An example for this is shown in "[1] E. Weinstein, K. Steele, A. Agarwal, and J. Glass, LOUD: A 1020-Node Microphone Array and Acoustic Beamformer. International congress on sound and vibration (ICSV), 2007" who describe the world's largest microphone array with 1020 microphones. In "[1] E. Weinstein, K. Steele, A. Agarwal, and J. Glass, LOUD: A 1020-Node Microphone Array and Acoustic Beamformer. International congress on sound and vibration (ICSV), 2007" it is also shown that the peak SNR increases by 13.7 dB when exploiting a simple delay-and-sum beamformer. For the presented speech recognition tasks, the microphone array results in an 87.2% improvement of the word error rate with interferers present. Similarly, "[2] H. F. Silverman, W. R. Patterson, and J. L. Flanagan. The huge microphone array. Technical report, LEMS, Brown University, 1996" analyzes the performance of large microphone arrays using 512 microphones and traditional signal processing algorithms.

Related work in the area of scene understanding is presented in "[4] M. S. Brandstein, and D. B. Ward. Cell-Based Beamforming (CE-BABE) for Speech Acquisition with Microphone Arrays. Transactions on speech and audio processing, vol. 8, no 6, pp. 738-743, 2000" which uses a fixed microphone array configuration that is sampled exhaustively. The authors split the scene in a number of cells that are separately evaluated for their energy contribution to the overall signal.

Additionally, they consider reflections by defining an external region with virtual, mirrored sources. The covariance matrix of the external sources is generated using a sinc function and thus assuming far field characteristics. By minimizing the energy of the interferences and external sources they achieve an improvement of approximately 8 dB over the SNR of a simple delay-and-sum beamformer. All experiments are limited to a set of 64 microphones but promise further gains over results reported in "[1] E. Weinstein, K. Steele, A. Agarwal, and J. Glass, LOUD: A 1020-Node Microphone Array and Acoustic Beamformer. International congress on sound and vibration (ICSV), 2007" given a similar number of microphones. This shows that careful consideration has to be given to the beam pattern design in order to best utilize the microphone array at hand.

An alternative approach for beampattern design for signal power estimation is given in "[5] J. Li, Y. Xie, P. Stoica, X. Zheng, and J. Ward. Beampattern Synthesis via a Matrix Approach for Signal Power Estimation. Transactions on signal processing, vol. 55, no 12, pp. 5643-5657, 2007." This method generalizes the conventional search for a single weighting vector based beampattern to a combination of weighting vectors, forming a weighting matrix.

This relaxation from rank 1 solutions to solutions with higher rank converts the required optimization problem from a non-convex to a convex one. The importance and power of formulating beampattern design problems as convex optimization problems is discussed in "[6] H. Lebret, and S. Boyd. Antenna Array Pattern Synthesis via Convex Optimization. Transactions on signal processing, vol 45, no 3, pp. 526-532, 1997." Furthermore, the method in "[5] J. Li, Y. Xie, P. Stoica, X. Zheng, and J. Ward. Beampattern Synthesis via a Matrix Approach for Signal Power Estimation. Transactions on signal processing, vol. 55, no 12, pp. 5643-5657, 2007" gives more flexibility to the beampattern design. For example, it is described how the main lobe is controlled while the highest side lobe of the beam pattern is minimized. Finally, the cited work discusses how to adaptively change the beampattern based on the current data from the source of interest and interferences. Drawbacks of this cited method are its focus on signal power estimation rather than signal extraction and its high computational complexity.

All methods cited above are only in limited part related to the work because none exploits adaptively the microphone array by considering "appropriate" subsets of sensors/microphones. Rather, these cited methods pre-design arrays or heuristically design an array shape good for the application at hand. Furthermore, they cannot be easily scaled beyond present limits (1020), e.g. to 10,000 or 100,000 sensors. An approach provided in accordance with various aspects of the present invention is that sensing (microphone configuration and positions) should be sensitive to the context (acoustic scenario). High dimensionality sensing will allow the flexibility to select an appropriate subset of sensors over space and time, adaptively process data, and better understand the acoustic scene in static or even dynamic scenarios.

A method described herein in accordance with one or more aspects of the present invention targets the creation of an acoustic map of the environment. It is assumed that it is unknown where the sources and interferences are in a space room nor what is considered to be a source and what an interference. Also, there is a very large number of microphones which cannot all be used at the same time due to the fact that this would be very costly on the processing side.

One task is to find areas in the space where energy is emitted. Therefore all microphones are focused on a specific pass region that thereafter is moved in a scanning fashion through the space.

The idea of a pass region is that one can only hear what happens in this pass region and nothing else (thus the rejection regions are ignored). This can be achieved to a certain degree by beamforming. Note that not all microphones are located in favor of every pass region that has to be defined in the scanning process. Therefore, different subsets of microphones are of interest for each pass region. For example microphones on the other side of the room are disregarded as the sound disperses though the distance. The selection of the specific microphones per pass region can be computed offline and stored in a lookup table for the online process. That is, to locate and characterize the target and interference source positions, their number and their spectral characteristics.

Figure 2:
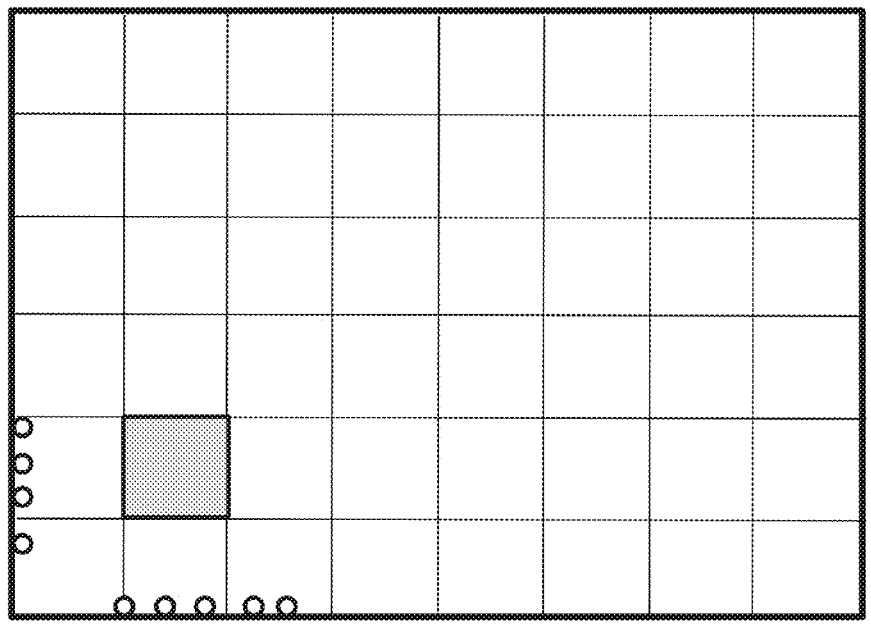
FIG. 2 illustrates a mask and related microphones in an array of microphones in accordance with an aspect of the present invention.
Figure 2:
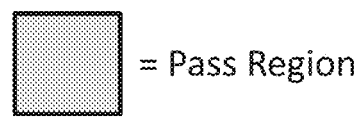
Figure 2:
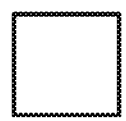
Figure 3:
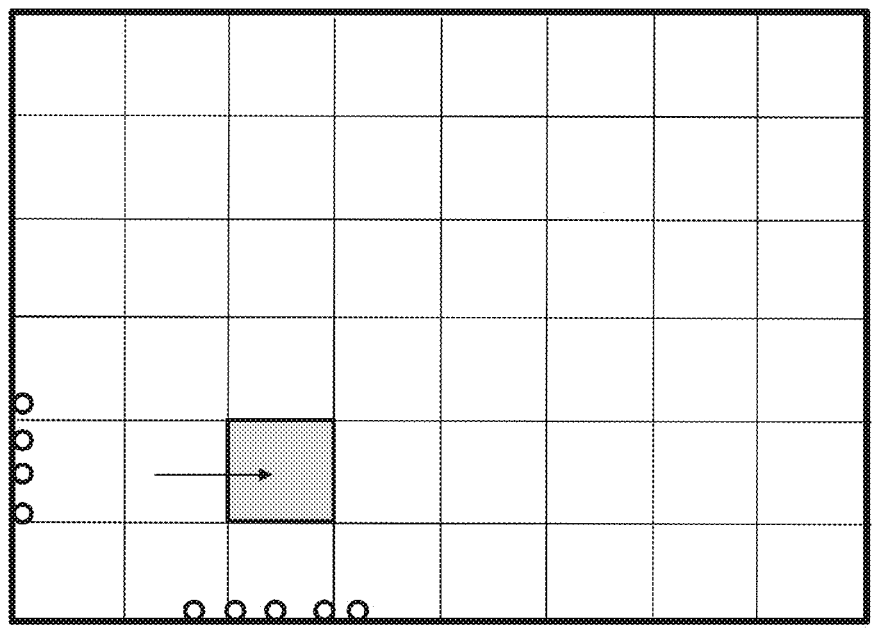
FIG. 3 illustrates another mask and related microphones in an array of microphones in accordance with an aspect of the present invention.
Figure 3:
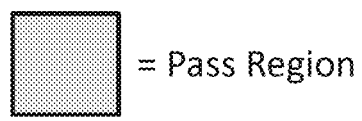
Figure 3:
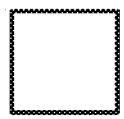

Exemplary steps in the approach are:
1. Predefine a collection of disjoint spatial masks covering the space of interest. Each mask has a pass region or pass regions for the virtual signal of interest, and complementary rejection regions, for assumed virtual interferences. This is illustrated in FIG. 2 with a mask in a first pass region and in FIG. 3 with the mask in a second pass region. It is noted that a virtual source and a virtual signal are an assumed source and an assumed signal applied to a mask to determine for instance the pass regions and rejection regions of such mask.
2. For each mask from the collection, compute a subset of microphones and the beamformer that maximizes gain for the pass region and minimizes gain for all rejection regions according to the optimization criteria which are defined in detail in sections below. This is illustrated in FIGS. 2 and 3, wherein the active microphones associated with the pass region of FIG. 2 are different than the active microphones associated with the pass region of FIG. 3;
3. Source presence and location can be determined by employing the masks in a scanning action across space as illustrated in FIGS. 2 and 3;
4. (Optional) Repeat 1-3 at resolution levels from low to high to refine the acoustic map (sources and the environment);
5. Sources can be characterized and classified into targets or interferences, based on their spectral and spatial characteristics;
6. Post optimization of sensor subsets and beam forming patterns for the actual acoustic scenario structure. For instance, a subset of microphones and the related beamformer for a mask containing or very close to an emitting source can then be further optimized to improve the passing gain for the pass region and to minimize the gain for the rejection region; and
7. Tracking of sources, and exploration repeating steps 1-6 above to detect and address changes in the environment.

The term active microphone herein means that the signal of the microphone in a subset is sampled and will be processed by a processor in a certain step. Signals from other microphones not being in the subset will be ignored in the step.

Figure 4:
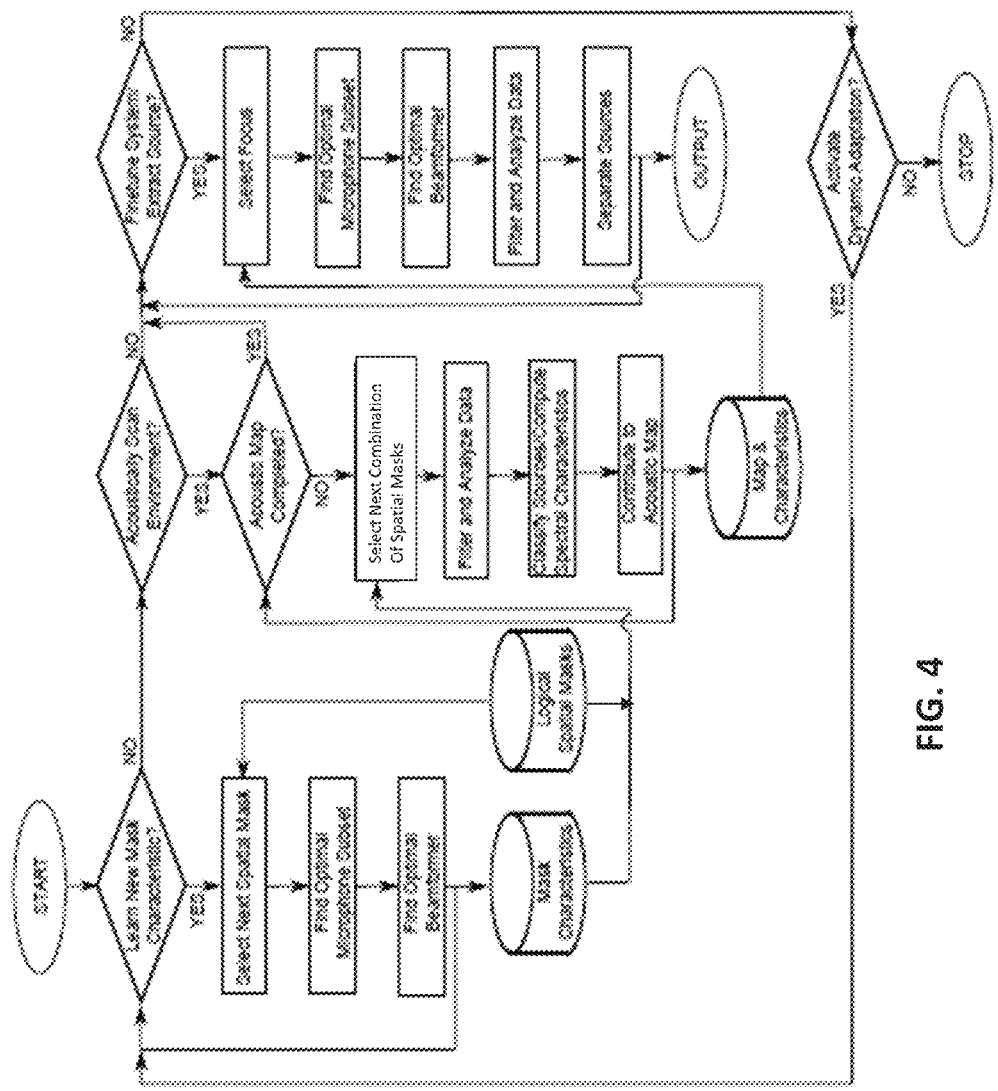
FIG. 4 is a flow diagram illustrating various steps performed in accordance with one or more aspects of the present invention.

The method above does not require a calibration of the acoustic sensing system or environment and does not exploit prior knowledge about source locations or impulse responses. It will exploit knowledge of relative locations of the microphones. In another instance, microphones can be self calibrated for relative positioning. A flow diagram of the method is illustrated in FIG. 4.

In one embodiment of the present invention the optimization criterion does not depend on an acoustic source. In one embodiment of the present invention the optimization criterion does not at least initially depend on an acoustic source.

FIGS. 2 and 3 illustrate the concept of scanning for locations of emitted acoustic energy through masks with different pass and rejection regions. Pass regions are areas of virtual signals of interest, rejection regions are areas of virtual interferences. A mask is characterized by a subset of active sensors and their beamforming parameters. Different sets of microphones are activated for each mask that best capture the pass region and are minimally affected by interferences in the rejection regions.

The selected size and shape of a mask depends on the frequency of a tracked signal component in a target signal among other parameters. In one embodiment of the present invention a mask covers an area of about 0.49 m×0.49 m or smaller to track/detect acoustic signals with a frequency of 700 Hz or greater. In one embodiment of the present invention masks for pass regions are evaluated when combined cover the complete room. In one embodiment of the present invention masks of pass regions are determined that cover a region of interest which may be only part of the room.

In accordance with an aspect of the present invention beam forming properties or pass properties associated with each mask and the related rejection regions are determined and optimized based on signals received by a subset of all the microphones in the array. Preferably there is an optimal number and locations of microphones of which the signals are sampled and processed in accordance with an adaptive beam forming filter. This prevents the necessity of having to use and process the signals of all microphones to determine a single pass mask. A process that would need to be repeated for all pass mask locations, which would clearly not be practical.

In one embodiment of the present invention, a relatively small array of microphones will be used, for instance less than 50. In that case it is still beneficial to use only an optimal subset of microphones determined from the array with less than 50 microphones. A subset of microphones herein in one embodiment of the present invention is a set that has fewer microphones than the number of microphones in the microphone array. A subset of microphones herein in one embodiment of the present invention is a set that has fewer than 50% of the microphones in the microphone array. A subset of microphones herein in one embodiment of the present invention is a set of microphones with fewer microphones than present in the microphone array and that are closer to their related pass mask than at least a set of microphones in the array that is not in the specific subset. These aspects are illustrated in FIGS. 1-3. FIG. 2 provides a simplified explanation, but a pass region can be more complex. For example, it can be a union of many compact regions in space.

Benefits of using a number of microphones to define a pass region mask that is smaller than the total number of microphones in the array will increase as the total number of microphones in an array increases and a greater number of microphones creates a greater number of signal samples to be processed. In one embodiment of the present invention, an array of microphones has fewer than 101 microphones. In one embodiment of the present invention, an array of microphones has fewer than 251 microphones. In one embodiment of the present invention, an array of microphones has fewer than 501 microphones. In one embodiment of the present invention, an array of microphones will be used with fewer than 1001 microphones. In one embodiment of the present invention, an array of microphones has fewer than 501 microphones. In one embodiment of the present invention, an array of microphones has fewer than 1201 microphones. In one embodiment of the present invention, an array of microphones has more than 1200 microphones.

In one embodiment of the present invention the number of microphones in a subset is desired to be not too large. The subset of microphones in the subset is sometimes a compromise between beamforming properties and number of microphones. To limit the number of microphones in a subset of microphones in an optimization method a term is desired for optimizing the subset that provides a penalty in the result when the number is large.

In one embodiment of the present invention a subset of microphones which has a first number of microphones and beamforming filters for the first subset of microphones is changed to a subset of microphones with a second number of microphones based on one or more detected acoustic sources. Thus, based on detected sources and in accordance with an aspect of the present invention the number of microphones in the subset, for instance as part of an optimization step, is changed.

The pass region mask and the complementary rejection region masks can be determined off-line. The masks are determined independent from actual acoustic sources. A scan of a room applies a plurality of masks to detect a source. The results can be used to further optimize a mask and the related subset of microphones. In some cases one would want to track a source in time and/or location. In that case not all masks need to be activated for tracking if no other sources exist or enter the room.

A room may have several acoustic sources of which one or more have to be tracked. Also, in that case one may apply a limited set of optimized masks and related subsets of microphones to scan the room, for instance if there are no or a very limited number of interfering sources or if the interfering sources are static and repetitive in nature.

Figure 5:
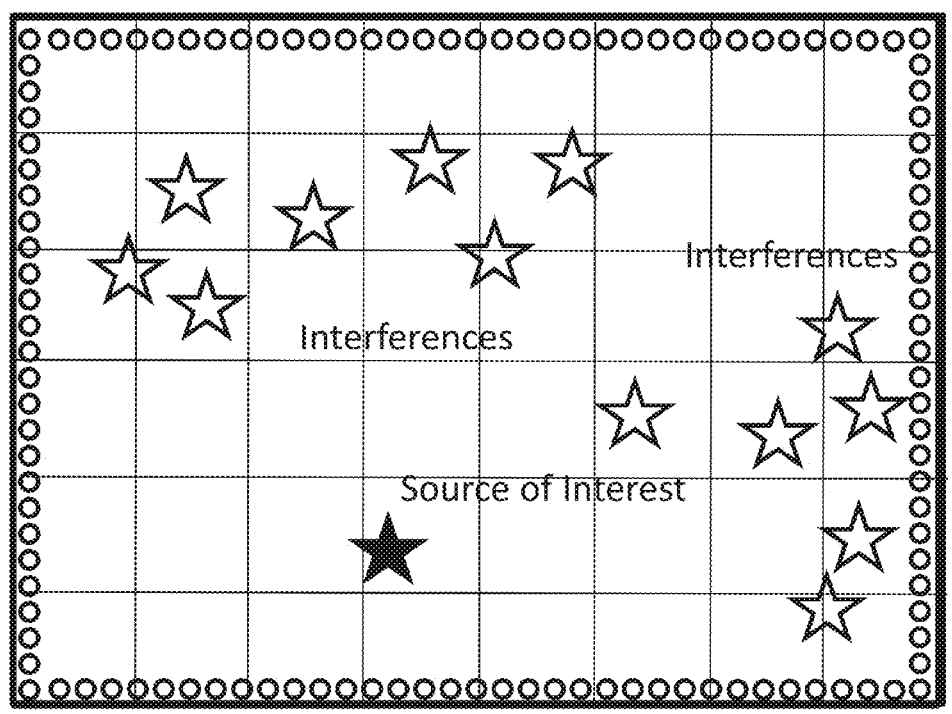
FIG. 5 illustrates application of masks with an array of microphones in an illustrative scenario in accordance with various aspects of the present invention.

FIG. 5 illustrates a scenario of a monitoring of a space with an ultra large array of microphone positioned in a rectangle. FIG. 5 shows small circles representing microphones. About 120 circles are provided in FIG. 5. The number of circles is smaller than 1020. This has been done to prevent cluttering of the drawing and to prevent obscuring other details. In accordance with an aspect of the present invention, the drawings may not depict the actual number of microphones in an array. In one embodiment of the present invention less than 9% of the actual number of microphones is shown. Depending on a preferred set-up, microphones may be spaces at a distance of 1 cm-2 cm apart. One may also use a smaller distance between microphones. One may also use greater distances between microphones.

In one embodiment microphones in an array are spaced in a uniform distribution in at least one dimension. In one embodiment microphones in at least part of the array are spaced in a logarithmic fashion to each other.

FIG. 5 in diagram illustrates a space covered by masks and monitored by microphones in a microphone array as shown in FIGS. 2 and 3. Sources active in the space are shown in FIG. 5. The black star indicates a target source of interest, while the white stars indicates active sources that are considered interferences. As a result of scanning the space with the different masks, wherein each mask is supported by its own set of (optimally selected) microphones, may generate a result as shown in FIG. 6. As an illustrative example the scan result is indicated as VL=Very Low, L=Low, M=Medium and H=High level of signal. Other types of characterization of a mask area are possible and are fully contemplated, and may include a graph of an average spectrum, certain specific frequency components, etc.

FIG. 6 shows that the source of interest is identified in one mask location (marked as H) and that all other masks are marked as low or very low. Further tracking of this source may be continued by using the microphones for the mask capturing the source and if the source is mobile possibly the microphones in the array corresponding to the masks surrounding the area of the source.

Optimization

Assume one predefined spatial mask covering the space of interest from the collection of masks. It has a pass region for the virtual signal of interest, and complementary rejection regions, for assumed virtual interferences, so one can assume that virtual interference locations are known (preset), and the virtual source locations are known. Assume an anechoic model:

$$x_n(t) = \sum_{l=1}^{L} a_{n,l} s_l(t - \kappa_{n,l}) + v_n(t), \ 1 \leq n \leq N \quad (1)$$

where N denotes the number of sensors (microphones), L the number of point source signals, $v_n(t)$ is the noise realization at time t and microphone n, $x_n(t)$ is the recorded signal by microphone n at time t, $s_l(t)$ is the source signal l at time t, $a_{n,l}$ is the attenuation coefficient from source l to microphone n, and $K_{n,l}$ is the delay from source l to microphone n.

The agnostic virtual source model makes the following assumptions:
1. Source signals are independent and have no spatial distribution (i.e. point-like sources);
2. Noise signals are realizations of independent and identically distributed random variables;
3. Anechoic model but with a large number of virtual sources;
4. Microphones are identical, and their location is known;

The above assumption 3 suggests to assume the existence of a virtual source in each cell of a fine space grid.

Let $M_n (\xi_n, \eta_n, \zeta_n)$ be the location of microphone n, and $P_l(\xi^l, \eta^l, \zeta^l)$ be the location of cell 1. Then $$a_{n,l} = \frac{d}{d_{n,l}}, \quad (2)$$

$$\kappa_{n,l} = \frac{d_{n,l}}{c},$$

$$d_{n,l} = \sqrt{(\xi_n + \xi^l)^2 + (\eta_n + \eta^l)^2 + (\zeta_n + \zeta^l)^2}$$

with c is the speed of sound and d can be chosen to $d=\min_n d_{n,l}$.

In accordance with an aspect of the present invention plain beamforming is extended into each cell of the grid. Here is the derivation of plain beamforming. Fix the cell index 1. Let $$y_l(t) = \sum_{n=1}^{N} \alpha_n x_n(t + \delta_n), \quad (3)$$

with $y_l(t)$ being the output of the beamformer, $\alpha_n$ being weights of each microphone signal and $\delta_n$ being time delays of each microphone signal, be an expression for the linear filter. The output is rewritten as:

$$y_l(t) = \sum_{n=1}^{N} \alpha_n a_{n,l} s_l(t - \kappa_{n,l} + \delta_n) + \text{Rest}(t) \quad (4)$$

wherein Rest(t) is the remaining noise and interference.

The equivalent output SNR from source 1 is obtained assuming no other interference except for noise:

$$\text{Rest}(t) = \sum_{n=1}^{N} \alpha_n v_n(t + \delta_n) \quad (5)$$

The computations are performed in the Fourier domain where the model becomes $$X_n(\omega) = \sum_{l=1}^{L} H_{n,l}(\omega) S_l(\omega) + v_n(\omega)$$

Here $H_{n,l}(\omega)$ is the transfer function from source 1 to microphone n (and is assumed to be known). $X_n(\omega)$ is the spectrum of the signal at microphone n, and $S_l(\omega)$ is the spectrum of the signal at source 1. The acoustic transfer function H can be calculated from an acoustic model. For instance the website at <URL http://sgm-audio.com/research/rierir.html> provides a model for room acoustics in which the impulse response functions can be determined for a channel between a virtual source in the room and a location of a microphone.

Let $\Omega \subset \{1, 2, \ldots, N\}$ be a subset of M microphones (those active). One goal is to design processing filters $K_n^r$ for each microphone and each source $1 \leq r \leq L$, $n \in \Omega$ that optimize an objective function J relevant to the separation task. One may consider the whole set of all Ks as a beamforming filter. Full array data is used for benchmarking of any alternate solution. For a target source r, the output of the processing scheme is:

$$Y_r(\omega) = \sum_{n \in \Omega} K_n^r X_n$$

$$= \underbrace{\left(\sum_{n \in \Omega} K_n^r(\omega) H_{n,r}(\omega)\right) S_r(\omega)}_{\text{target source}} + \underbrace{\sum_{l=1, l \neq r}^{L} \left(\sum_{n \in \Omega} K_n^r(\omega) H_{n,l}(\omega)\right) S_l(\omega)}_{\text{interferers}} +$$

$$\underbrace{\sum_{n \in \Omega} K_n^r(\omega) v_n(\omega)}_{\text{noise}}$$

The maximum Signal-to-Noise-Ratio processor (which acts in the absence of any interference for source r) is given by the matched filter:

$$K_n^r(\omega) = \overline{H_{n,r}(\omega)}$$

in which case:

$$\left|\sum_{n \in \Omega} K_n^r(\omega) H_{n,r}(\omega)\right|^2 = \left(\sum_{n \in \Omega} |K_n^r(\omega)|^2\right)\left(\sum_{n \in \Omega} |H_{n,r}(\omega)|^2\right).$$

However this plain beamforming solution matched filter may increase the leakage of interferers into output. Instead it is desired to minimize the "gap" performance to the matched filter:

$$J((K_n^r)_{n \in \Omega}) = \left(\sum_{n \in \Omega} |K_n^r(\omega)|^2\right)\left(\sum_{n \in \Omega} |H_{n,r}(\omega)|^2\right) - \left|\sum_{n \in \Omega} K_n^r(\omega) H_{n,r}(\omega)\right|^2 \quad (6)$$

subject to constraints on interference leakage and noise:

$$\left|\sum_{n \in \Omega} K_n^r(\omega) H_{n,l}(\omega)\right|^2 \leq \tau_l, \quad (7)$$

$$1 \leq l \leq L, l \neq r$$

$$\sum_{n \in \Omega} |K_n^r(\omega)|^2 \leq 1 \quad (8)$$

The real version of the problem is as follows. Set $K_n^r = X_n + iY_n$, $H_{n,l} = A_{n,l} + iB_{n,l}$.
The criterion becomes:

$$J(X, Y) = \left(\sum_{n \in \Omega} |X_n|^2 + |Y_n|^2\right)\left(\sum_{n \in \Omega} |A_{n,r}|^2 + |B_{n,r}|^2\right) - \left|\sum_{n \in \Omega} (A_{n,r} X_n - B_{n,r} Y_n)\right|^2 - \left|\sum_{n \in \Omega} (B_{n,r} X_n + A_{n,r} Y_n)\right|^2$$

which is rewritten as:

$$J(X, Y) = [X^T \quad Y^T] R \begin{bmatrix} X \\ Y \end{bmatrix} \quad (9)$$

The constraints are rewritten as:

$$[X^T \quad Y^T] Q_l \begin{bmatrix} X \\ Y \end{bmatrix} = \left|\sum_{n \in \Omega} (A_{n,l} X_n - B_{n,l} Y_n)\right|^2 + \left|\sum_{n \in \Omega} (B_{n,l} X_n + A_{n,l} Y_n)\right|^2 \leq \tau_l \quad (10)$$

and $$[X^T \quad Y^T] \begin{bmatrix} X \\ Y \end{bmatrix} = \sum_{n \in \Omega} (|X_n|^2 + |Y_n|^2) \leq 1 \quad (11)$$

Here the matrices R and $Q_l$ are given by:

$$Q_l = \begin{bmatrix} A_l \\ -B_l \end{bmatrix} [A_l^T - B_l^T] \begin{bmatrix} B_l \\ A_l \end{bmatrix} [B_l^T + A_l^T] \quad (12)$$

for all $1 \leq l \leq L$ and $$R = (\|A_r\|^2 + \|B_r\|^2) I_{2M} - Q_r \quad (13)$$

Consider the following alternative criteria. Recall the setup. It is desired to design weights $K_n$ that give the following gains:

$$\text{Gain}_l = \left|\sum_{n \in \Omega} K_n H_{n,l}\right|^2, \quad 1 \leq l \leq L \quad (14)$$

$$\text{Gain}_0 = \sum_{n \in \Omega} |K_n|^2 \quad (15)$$

where $1 \leq \leq L$ indexes source 1, and $\text{Gain}_0$ is the noise gain.

Signal-to-Noise-Plus-Average-Interference Ratio
Signal-to-Noise-Plus-Average-Interference-Ratio
One possible criterion is to maximize:

$$A(K) = \frac{Gain_r}{Gain_0 + \sum_{l=1, l \neq r}^{L} Gain_l} \quad (16)$$

Since this is a ratio of quadratics (a generalized Rayleigh quotient) the optimal solution is given by a generalized eigenvector.

The problem with this criterion is that it does not guarantee that each individual $Gain_l$ is small. There might exist some interferers that have large gains, and many other sources with small gains.

Advantage: Convex

Disadvantage: (a) Does not guarantee that each interference gain is small. There may be a source with a large gain if there are many others with small gains. (b) Does not select a subset of microphones nor penalizes the use of a large number of microphones Signal-to-Worst-Interference-Ratio A more preferred criterion is:

$$B(K) = \frac{Gain_r}{\max_{0 \leq l \leq L, l \neq r} Gain_l} \quad (17)$$

However it is not obvious if this criterion can be solved efficiently (like the Rayleigh quotient).

Advantage: Guarantees that each interference gain is below a predefined limit.

Disadvantage: (a) Not obvious if it can be solved efficiently (b) Does not select a subset of microphones nor penalizes the use of a large number of microphones.

Wiener Filter

Assume that the noise spectral power is $\sigma_0^2$, then the optimizer of $$C(K) = E \left[ \left| \left( \sum_{n \in \Omega} K_n H_{n,r} - 1 \right) (S_r) \right|^2 + \sum_{l=1, l \neq r}^{L} \left| \left( \sum_{n \in \Omega} K_n H_{n,l} \right) S_l \right|^2 + \left| \sum_{n \in \Omega} K_n v_n \right|^2 \right] \quad (18)$$

is given by:

$$Z = \rho_r \left( \sigma_0^2 I_{2M} + \sum_{l=1}^{L} \rho_l Q_l \right)^{-1} \begin{bmatrix} A_r \\ -B_r \end{bmatrix} \quad (19)$$

where $$\rho_l = E[|S_l|^2], \sigma_0^2 = E[|v_n|^2]$$

(all n), and $A_r$, $B_r$, $Q_l$ are matrices constructed in (12) and I is the identity matrix.

Advantage: (a) Closed form solution available (b) Stronger interference sources are attenuated more; weaker interference sources have a smaller effect on filter.

Disadvantage: (a) Does not guarantee that each interference gain is small. There may be a source with a large gain if there are many others with small gains. (b) Does not select a subset of microphones nor penalizes the use of a large number of microphones. (c) Requires the knowledge of all interference sources spectral powers.

Log-Exp Convexification

Following Boyd-Vandenberghe in "[3] S. Boyd, and L. Vandenberghe. Convex Optimization. Cambridge university press, 2009," the maximum of $(x_0, \ldots, x_N)$ can be approximated using the following convex function:

$$\log(e^{x_0} + e^{x_1} + \ldots + e^{x_N})$$

Then a convex function on constraints reads $$J_{log}(K) = \log\left(e^{Z^T Q_0 Z} + e^{Z^T Q_1 Z} + \ldots + e^{Z^T Q_L Z}\right), \quad (20)$$

$$Z = \begin{bmatrix} X \\ Y \end{bmatrix} = \begin{bmatrix} \text{real}(K) \\ \text{imag}(K) \end{bmatrix}$$

where ' means the $r^{th}$ term is missing, and $Q_0 = I_{2M}$ (the identity matrix).

A second novelty is to merge the outer optimization loop with the inner optimization loop by adding a penalty term involving the number of nonzero filter weights ($K_i$). An obvious choice would be the zero pseudo-norm of this vector. However such choice is not convex. Instead this term is substituted by the $l^1$-norm of vector Z.

Recalling that the interest is in minimizing the gap $Z^T R Z$ given by (9), the full optimization reads:

$$D(Z) = Z^T R Z + \mu \log\left(\sum_{l=0, l \neq r}^{L} e^{Z^T Q_l Z}\right) + \lambda \|Z\|_1 \quad (21)$$

which is convex in the 2M-dimensional variable Z. Here $\mu$ and $\lambda$ are cost factors that weight the interference/noise gains and filter $l^1$-norm against the source of interest performance gap. As before, minimize D subject to real $(K_{n_0}^r) = Z_{n_0} \alpha$.

Advantage: (a) Can be solved efficiently; (b) Penalizes large numbers of microphones and allows the selection of the subset of microphones of interest. Disadvantage: (a) Only an approximation of the maximum interference is used.

Gap+Max+$L^1$ Criterion

Maximum can be used to build a convex optimization problem. The criterion to minimize reads:

$$E(Z) = Z^T R Z + \mu \tau + \lambda \|Z\|_1 \quad (22)$$

subject to the following constraints:

$$\tau \geq 0 \quad (23)$$

$$Z^T Q_l Z \leq \tau, \; 2 \leq l \leq L \quad (24)$$

$$Z^T Z \leq \tau \quad (25)$$

The following unbiased constraint is imposed $$\sum_{k=1}^{N} K_n H_{n,1} = 1 \quad (26)$$

Advantage: (a) Can be solved efficiently; (b) Penalizes large numbers of microphones and allows the selection of the subset of microphones of interest.

Disadvantage: (a) Uses the gain of the source of interest in the cost function.

Max+$L^1$ Criterion

Since the target source is unbiased its gain is guaranteed to be one. Hence a more plausible optimization criterion is given by:

$$F(Z) = \tau + \lambda \|Z\|_l \quad (27)$$

subject to the following constraints:

$$\tau \geq 0 \quad (28)$$

$$Z^T Q_l Z \leq \tau, \quad 2 \leq l \leq L \quad (29)$$

$$Z^T Z \leq \tau \quad (30)$$

where $Z^T Z$ represents the noise gain. Again, the following unbiased constraint is imposed:

$$\sum_{k=1}^{N} K_n H_{n,1} = 1 \quad (26)$$

Advantage: (a) Can be solved efficiently; (b) Penalizes large numbers of microphones and allows the selection of the subset of microphones of interest; (c) Simplification over the Gap+Max+$L^1$ Criterion.

Max+$L^\infty$ Criterion

When source signals are broadband (such as speech or other acoustic signals) the optimization criterion becomes:

$$F(Z^1, Z^2, \ldots, Z^P) = \sum_{f=1}^{P} \tau_f + \lambda \sum_{k=1}^{N} \max_{1 \leq f \leq P} |Z_k^f|$$

subject to the constraints (28), (29), (30) for each pair ($\tau_1$, $Z^1$), ($\tau_2$, $Z^2$), ..., ($\tau_M$, $Z^F$), where the index f denotes a frequency in a plurality of frequencies with P its highest number. (the symbol P is used because F is applied for the function $F(Z^1, Z^2, \ldots, Z^P)$.)

Again, the unbiased constraint (26) is imposed on Z, for each frequency.

Advantages: (a) All advantages of Max+$L^1$ criterion; (b) Addresses multiple frequencies in a unified manner.

It is again noted that in the above the term "virtual source" is used. A "virtual source" is an assumed source. A source is for instance assumed (as a "virtual source") for a step of the search that a source is at a particular location. That is, it is (at least initially) not known where the interferences are. Therefore, a filter is designed that assumes interferences (virtual interferences as they are potentially not existing) everywhere but at a point of interest that one wants to focus on at a certain moment. This point of interest is moved in multiple steps through the acoustic environment to scan for sources (both interferences and sources of interest).

Figure 7:
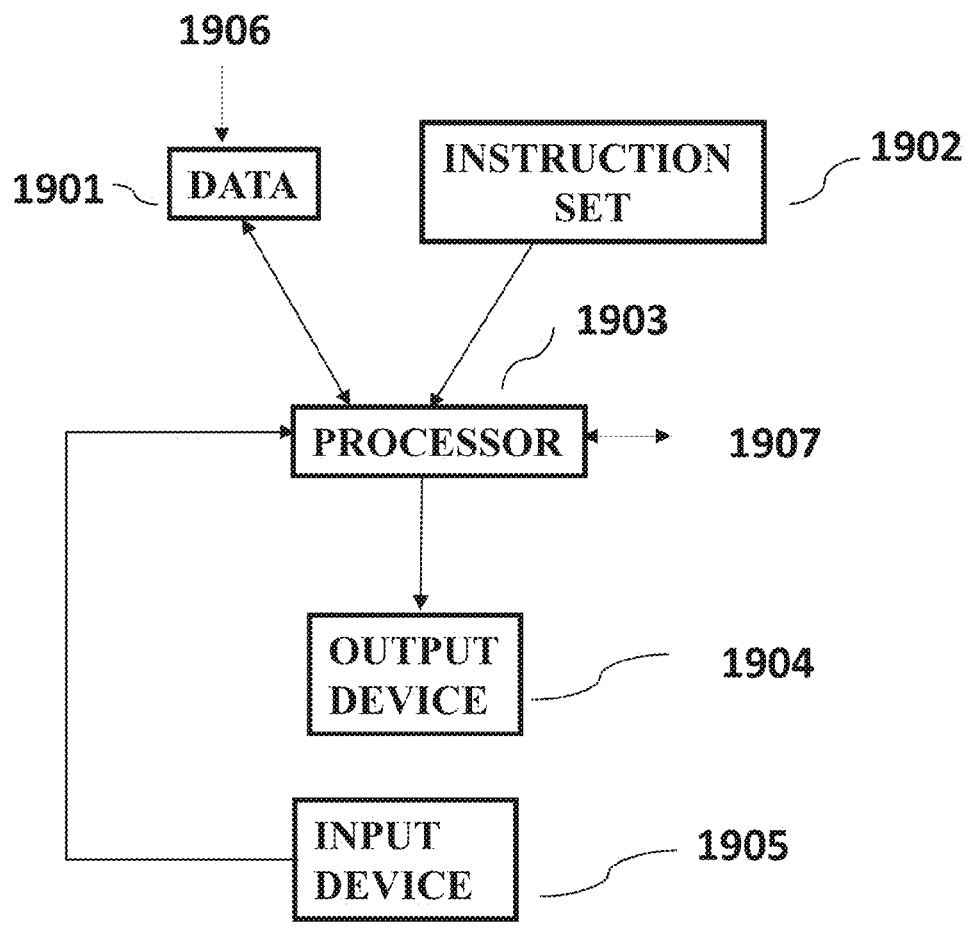
FIG. 7 illustrates a system enabled to perform steps of methods provided in accordance with various aspects of the present invention.

The methods as provided herein are, in one embodiment of the present invention, implemented on a system or a computer device. Thus, steps described herein are implemented on a processor, as shown in FIG. 7. A system illustrated in FIG. 7 and as provided herein is enabled for receiving, processing and generating data. The system is provided with data that can be stored on a memory 1701. Data may be obtained from sensors such as an ultra large microphone array for instance or from any other data relevant source. Data may be provided on an input 1706. Such data may be microphone generated data or any other data that is helpful in a system as provided herein. The processor is also provided or programmed with an instruction set or program executing the methods of the present invention that is stored on a memory 1702 and is provided to the processor 1703, which executes the instructions of 1702 to process the data from 1701. Data, such as microphone data or any other data triggered or caused by the processor can be outputted on an output device 1704, which may be a display to display a result such as a located acoustic source or a data storage device. The processor also has a communication channel 1707 to receive external data from a communication device and to transmit data to an external device. The system in one embodiment of the present invention has an input device 1705, which may include a keyboard, a mouse, a pointing device, one or more cameras or any other device that can generate data to be provided to processor 1703.

The processor can be dedicated or application specific hardware or circuitry. However, the processor can also be a general CPU, a controller or any other computing device that can execute the instructions of 1702. Accordingly, the system as illustrated in FIG. 7 provides a system for processing data resulting from a microphone or an ultra large microphone array or any other data source and is enabled to execute the steps of the methods as provided herein as one or more aspects of the present invention.

In accordance with one or more aspects of the present invention methods and systems for area monitoring by exploiting ultra large scale arrays of microphones have been provided. Thus, novel systems and methods and steps implementing the methods have been described and provided herein.

Tracking can also be accomplished by successive localization of sources. Thus, the processes described herein can be applied to track a moving source by repeatedly applying the localization methods described herein.

Consider again a large scale sensor array having N sensors that monitors a surveillance area, as for instance illustrated in FIG. 1. Using all N sensors simultaneously may be unreasonable in terms of power consumption and data processing. For example, for N=10,000 sensors and a data sampling rate of 100,000 samples per second, the bandwidth requirement is 1 Gsamples/sec.

A system may be able to poll and process data of only a subset of D sensors at any one given time instead.

The N choose D number of choices of sensors allows for a myriad of possible sensor configurations, and the task is then to choose a subset that achieves an objective of the sensors.

Alternatively, a problem is to place D sensors in a constrained region of space. In accordance with an aspect of the present invention, this non-convex optimization problem is converted into a combinatorial problem by discretizing the possible set of sensor locations. In this context the approach can be seen as an optimal test design.

Assume the surveillance area contains a set of point-like sources. A sensor configuration is required that minimizes the largest interference gain from a potentially very large number of locations while still maintaining target unit gain.

The following four hypotheses are assumed:

H1. Sensor locations (x, y, z-coordinates) are known. Their locations however can be arbitrary.

H2. The number of real interferences, their locations and spectral powers are unknown.

H3. The maximum number of sensors active at any time, D, is fixed in advance.

H4. The signals that are to be monitored are wide band.

When sensors have local computational processing power, an additional hypothesis is made:

H5. Sensors can band-pass signals and they can switch data transmission on a sample-by-sample basis.

Under H5, a system as provided herein, is configured to selectively sample the space-time/frequency domain. The system divides the surveillance area into a large number of small, non-overlapping target areas. For each fixed target area, it finds a subset of sensors that minimizes the gain of a large number of virtual interferences. By doing so, the system is robust to a wide variety of unknown interference configurations. It then begins to iteratively scan each target area. By measuring the signal strength in each fixed target area, the system is able to locate and then monitor the actual targets.

Figure 8:
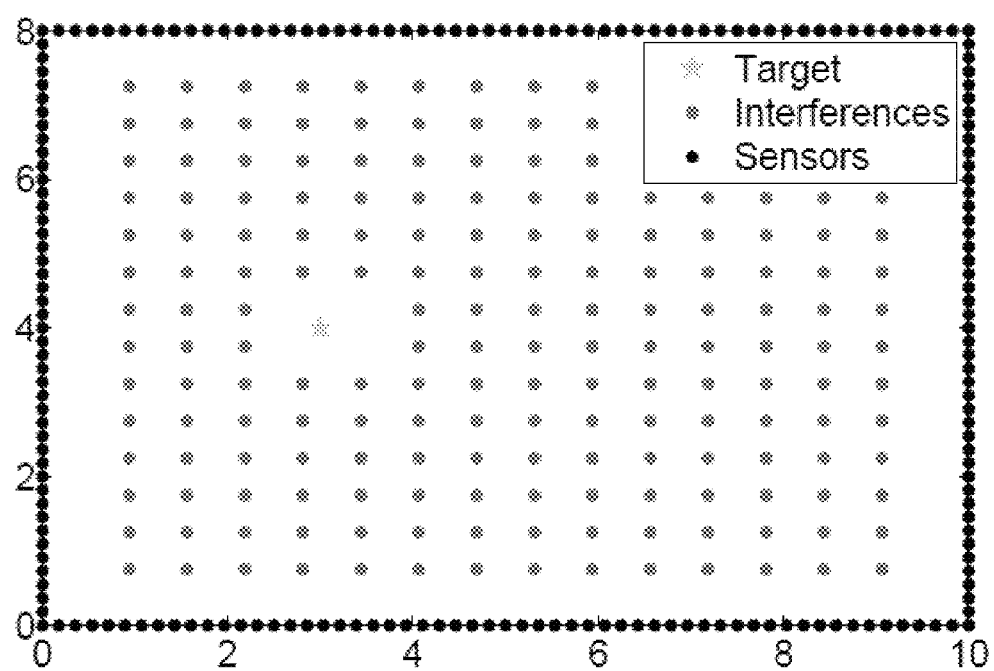
FIG. 8 illustrates a sensor set-up in accordance with an aspect of the present invention.

Consider the setup as illustrated in FIG. 8. It is assumed the sensor locations are known and a target area is fixed. Since the number, locations, and power distributions of the interferences are unknown, a large number of "virtual" interferences is assumed, say L. One objective is to minimize the largest gain from this set of "virtual" interferences, which guarantees a small gain for any one actual interference located at any of the virtual interference locations.

The number L of interferences may be determined on the basis of one or more requirements or assumptions. In one embodiment of the present invention it may be unknown a priori what the actual number of interferences is or it is not desired to make an assumption about interferences. In such an embodiment one may assume that there is a uniform distribution of interferences in an area monitored by N microphones. The distance between these interferences plays a role as it determines the resolution with which one enforces the criterion that minimizes the largest gain from the area that is covered by interferences. That is, if the assumed "virtual" interference locations are spaced too far apart there may be a location in between them with a high gain where an interference could disturb the target signal. Accordingly, the assumed distance between interferences or assumed interference sources, is determined by the frequency for which methods of the present invention are applied. A maximum distance between assumed interference sources is then half a wavelength of the maximum frequency for which a subset of microphones is determined. As an illustrative example: determining a subset of microphones with microphone weights for sound waves at 1650 Hz maximum would require a maximum distance of about 10 cm of assumed interferences (depending on actual speed of sound at an assumed temperature). A rectangular area of 10 m by 8 m monitored by for instance 1000 microphones may require 8000 interferences at 10 cm distance on a rectangular grid. If a minimum distance of 50 cm from a wall is imposed one arrives at about 6200 interference locations. The diagonal distance between interferences is of course greater than 10 cm (about 14 cm). Accordingly, the actual maximum frequency that relates to this setup may be lower, more likely closer to 1200 Hz.

If one knows or assumes where certain targets and/or interferences are, it is possible to modify a density of interferences. That is, one would apply a density determined by a highest frequency of an acoustic signal around or near to the assumed target, but a lower density farther away from the target.

One may also want to make a trade-off between required resolution and available computing power. For instance, a frequency of 10 kHz would require a distance of less than 2 cm between interferences. This may form an undue burden on available computing power. One may address this by only requiring the maximum required distance of interferences related to a frequency in an immediate vicinity of an assumed target. For instance in a radius of preferably 10 times, more preferably 25 times and most preferably 100 times the wavelength of the related frequency preferably above 1000 Hz, more preferably above 2000 Hz, most preferably above 5000 Hz.

In one embodiment of the present invention one may determine a subset of microphones based on a distance of interferences that is not greater than 15 cm within a monitored area of at least 4 m$^2$ of an assumed target.

In one embodiment of the present invention one may determine a subset of microphones based on a distance of interferences that is not greater than 1 meter within a monitored area of at least 25 m$^2$ of an assumed target.

In one embodiment of the present invention an area monitored by N microphones a subset of D microphones is selected by applying methods provided herein and with at least one area of one square meter within the monitored area with at least 10 assumed interferences or an interference density that is equivalent. In one embodiment of the present invention an area monitored by N microphones a subset of D microphones is selected by applying methods provided herein and with at least one area of one square meter within the monitored area with at least 100 assumed interferences or an interference density that is equivalent. In one embodiment of the present invention an area monitored by N microphones a subset of D microphones is selected by applying methods provided herein and with at least one area of one square meter within the monitored area with at least 1000 assumed interferences or an interference density that is equivalent.

In one embodiment of the present invention an area monitored by N microphones a subset of D microphones is selected by applying methods provided herein and with at least one area of one square meter within the monitored area with at least 1 assumed interference or an interference density that is equivalent.

Aspects of the present invention can also be applied to processing of infrasound acoustic signals, which range from 20 Hz to as low as 0.0001 Hz. These signals can be used to monitor events like earthquakes. Under infrasound conditions, a monitored area may be large, for instance greater than 1 square kilometer. The density of interferences in the case of infrasound is much lower than 1 interference per square meter and may be equivalent to or lower than 1 interference per 100 square meters and equivalent to or lower than 1 interference per square kilometer.

In accordance with an aspect of the present invention a number of interference sources and their locations is provided to a processor from a memory, for instance by a map with a lay-out of interference sources that allows a processor to determine the subset D of N microphones in accordance with one or more aspects of the present invention provided herein.

In accordance with an aspect of the present invention one or more frequencies of acoustic signals to be considered are provided to a processor including conditions related to an area that is monitored by the N microphones. Based on rules related to those frequencies as explained herein are applied by the processor to determine a lay-out of interference sources that allows a processor to determine the subset D of N microphones in accordance with one or more aspects of the present invention provided herein.

No matter which method of determining location and lay-out of interference sources is applied, the processor will have sufficient information to apply the steps as explained herein to determine the subset D of N microphones based on at least 2 different frequencies.

An interference herein may be a real interference or a "virtual" or assumed interference.

Assume the zero indexed source is the target and the remaining L sources are interferences. For these "virtual" L+1 sources the direct-path model is used, where the transfer function between source l and sensor n at frequency f is given by:

$$H_{l,n}(f_i) = \exp(-2\pi i f_i c \|r_l - r_n\|) / \|r_l - r_n\|, \ 0 \leq l \leq L, \ 1 \leq n \leq N,$$

where $r_n$, $r_l$ denote the position vectors of sensor n and source l respectively, and c is the wave propagation speed (e.g. speed of sound for acoustic signals). This simple direct-path model is used because no prior knowledge of wall locations and their reflection coefficients is assumed. For evaluation, a direct-path plus one reflection off each wall model is assumed.

Let $w_n(f_i)$ denote the processing weight for sensor n at frequency $f_i$. If $w_n(f_i)=0$ then sensor n is inactive at frequency $f_i$.

Assume that there are F distinct frequencies of interest, $f_1, f_2, \ldots f_F$.

Given F sets of N sensor weights, each interference l has F different gains, one for each frequency. Note that for each of the F frequencies, a different set of N sensor weights is used to calculate the interference gains at that frequency. One objective is to minimize the maximum sum of gains across F frequencies while still achieving target unit gain at each frequency. Assumption H3, however, limits to apply D simultaneously active sensors.

In the above multi-frequency setup, when H5 is not satisfied, sensor n becomes active if $w_n(f_i) \neq 0$ for any i. Thus the number of nonzeros in the N-dimensional vector $$\max_{1 \leq i \leq F} |w_n(f_i)|$$

is then an appropriate measure of the number of active sensors. Let $\|w\|_0$ denote the pseudo-norm which counts the number of non-zeros in the vector w.

The optimization problem is stated as follows:

$$\min_{(w_n(f_i))_{i=1, n=1}^{F,N}} \max_{1 \leq l \leq L} \sum_{i=1}^{F} \left| \sum_{n=1}^{N} H_{l,n}(f_i) w_n(f_i) \right|$$

subject to $$\sum_{n=1}^{N} H_{0n}(f_i) w_n(f_i) \text{ for } i = 1, 2, \ldots, F \ \left\| \max_{1 \leq i \leq F} |w_n(f_i)| \right\|_0 \leq D$$

This is a non-convex optimization problem due to the $l^0$ pseudo-norm constraint $$\left\| \max_{i \leq i \leq F} |w_n(f_i)| \right\|_0 \leq D.$$

When hypothesis H5 is satisfied, the optimization problem (27) can be solved independently for each frequency, and one can then implement an adaptive space-time-frequency sampling. The two sampling scenarios will be compared later herein.

Convex Optimization Strategy

The method provided herein in accordance with one or more aspects of the present invention is inspired by LASSO regularization as described in "[7] R. Tibshirani, "Regression shrinkage and selection via the lasso," Journal of the Royal Statistical Society (Series B), vol. 58, pp. 267-288, 1996" which is incorporated herein by reference, and describes a regression technique that minimizes the sum of squares of residual errors subject to the $l^1$ norm of the coefficients being less than a constant. Similar to the sparse signal and model estimation approach described in "[8] E. J. Candes and Y. Plan, "Near-ideal model selection by l1 minimization," Annals of Statistics, vol. 37, no. 5A, pp. 2145-2177, 2009", which is incorporated herein by reference, the $l^0$ pseudo-norm is replaced by the $l^1$ norm $\|w\|_l = \sum_{n=1}^{N} w_n(f)|$ which is then incorporated into the optimization criterion using a Lagrange multiplier $\lambda$. The optimization problem (27) is then replaced by the following convex optimization problem which is called herein the $\lambda$-method:

$$\min_{(w_n(f_i))_{i=1, n=1}^{F,N}} \max_{1 \leq l \leq L} \sum_{i=1}^{F} \left| \sum_{n=1}^{N} H_{l,n}(f_i) w_n(f_i) \right| + \lambda \sum_{n=1}^{N} \max_{1 \leq i \leq F} |w_n(f_i)|$$

subject to:

$$\sum_{n=1}^{N} H_{0n}(f_i) w_n(f_i) = 1 \text{ for } i = 1, 2, \ldots, F \quad (28)$$

For very large $\lambda$, the penalty term forces many of the sensors to become inactive. Specifically, let W be the N by F matrix of sensor weights produced by the optimization. With a large $\lambda$ penalty, many of the rows of W contain only values very close to zero. If the nth row only contains such small values, sensor n is then inactive. As $\lambda$ decreases the penalty term becomes less expensive and more sensors become active. At the limit, $\lambda=0$, all sensors are allowed to be active. The parameter $\lambda$ is fine tuned until there are D non-zero components. Specifically, this is accomplished when $g_{n_{D+1}}$ is significantly smaller than $g_{n_1}$, where $$g_n = \max_{1 \leq i \leq F} |w_n(f_i)|.$$

Significantly smaller, in accordance with an aspect of the present invention, is at least a factor 10. Significantly smaller, in accordance with another aspect of the present invention, is at least a factor 100. Significantly smaller, in accordance with yet another aspect of the present invention, is at least a factor 1000.

In accordance with a further aspect of the present invention D is selected or determined from a set of ordered sensor weights wherein a $(D+1)^{th}$ weight is significantly smaller than the $D^{th}$ weight. Significantly smaller in this context is preferable a factor 10 smaller, more preferably a factor 100 smaller and most preferably a factor 1000 smaller.

Equation (28) is then solved using this $\lambda$. The final weights are obtained by solving a second time (28) restricted to the sub matrix indexed by A and λ=0, commonly known as the debiasing step as described in "[7] R. Tibshirani, "Regression shrinkage and selection via the lasso," Journal of the Royal Statistical Society (Series B), vol. 58, pp. 267-288, 1996."

When optimization is performed over multiple frequencies (28), the support of the chosen microphones remains fixed over the frequencies. However, one can also run (28) for each individual frequency of interest. Then the support of the microphones can vary over frequencies. If the frequencies are chosen with uniform spacing, non-uniform sampling can be used to reconstruct the signals of interest at each frequency.

Specifically assume there are a total of R frequency bands (e.g. R=4 as in the results below). Then each sensor has an additional R-channel filter bank each processing disjoint frequency bands. The filter bank outputs are downsampled by R and the corresponding sample streams are sent according the transmission policy obtained in the optimization step. The central controller reconstructs the broadband signal by putting together the disjoint frequency bands.

Simulated Annealing

The robustness of the solution found by convex optimization is tested through simulated annealing (SA). Simulated annealing is a simple randomized technique for iterative improvement introduced in "[9] S. Kirkpatrick and M P Vecchi, "Optimization by simulated annealing," science, vol. 220, no. 4598, pp. 671-680, 1983." SA will probabilistically accept worse transitions in order to avoid local minima. In this case, SA minimizes the objective function given by the largest gain for all interference positions for a fixed size subset of microphones over locations of the microphones in the subset. More precisely, given a fixed number of D microphones, the same convex optimization problem is run as the λ method (i.e. find the filter weights that minimize the maximum valid interference over a coarse grid while maintaining a target gain of unity) but with λ set to 0. The objective function value f is then the largest gain of the valid interferences.

If the optimization program fails for any reason, the objective function value is set to infinity. The initial temperature is set to 100, and the annealing schedule decreases the temperature by 5% each iteration. The length of the Markov walk is limited to a total length of 1200 iterations. The initial search point is the point produced by the A found through an iterative binary search that produces D=32 microphones. It is assumed that the target location, room size, and the frequency of interest are fixed.

Relation to Prior Work

The herein provided approach is compared to four problems in the literature: the beam pattern design, grid-based beamforming, compressive sampling, and greedy selection.

Beampattern Design

Lebret and Boyd in "[6] H. Lebret and S. Boyd, "Antenna array pattern synthesis via convex optimization," Signal Processing, IEEE Transactions on, vol. 45, no. 3, pp. 526-532, 1997" which is incorporated by reference herein, showed that given arbitrary sensor locations, finding the set of sensor weights that minimizes the maximum interference for multiple frequencies could be formulated as a convex optimization problem. They modeled sources as point sources, complex exponentials decaying as a function of distance.

Specifically, the problem could be showed equivalent with a Second Order Cone Programming (SOCP) problem and thus efficiently solved by interior point methods as described in "[10] M. S. Lobo, L. Vandenberghe, S. Boyd, and H. Lebret, "Applications of second-order cone programming," Linear algebra and its applications, vol. 284, no. 1, pp. 193-228, 1998" which is incorporated herein by reference. The work provided in the present document differs with the cited reference in that herein there is a simultaneously search for filter weights for each frequency of interest that minimize the maximum interference at the corresponding frequency. In contrast, Lebret and Boyd search for only a single set of filter weights that minimizes the maximum interference for multiple frequencies. The present approach provided herein is similar in spirit to that of Ling et al. as described in "[11] C. Ling, S. Wee, C. Wei, and Y. Zhu Liang, "Linear sparse array synthesis via convex optimization," in Circuits and Systems (ISCAS), Proceedings of 2010 IEEE International Symposium on, 2010, pp. 4233-4236" which is incorporated herein by reference, wherein the authors followed the approach of "[6] H. Lebret and S. Boyd, "Antenna array pattern synthesis via convex optimization," Signal Processing, IEEE Transactions on, vol. 45, no. 3, pp. 526-532, 1997" but added an additional $l^1$ norm penalty to the weights. The $l^1$ penalty sparsifies the sensor weights and therefore sensor locations. Specifically, the $l^1$ penalty on weights causes many of the filter weights to be close to zero in magnitude. The present and herein provided work differs in the following three aspects.

First, the $l^1$ penalty in the present approach, as opposed to "[11] C. Ling, S. Wee, C. Wei, and Y. Zhu Liang, "Linear sparse array synthesis via convex optimization," in Circuits and Systems (ISCAS), Proceedings of 2010 IEEE International Symposium on, 2010, pp. 4233-4236", encourages the use of sensor locations that perform well across frequencies when the sensor is allowed to use a different weight for each frequency. Second, the present approach allows both sensors and interferences to lie in multiple dimensions, as opposed to "[11] C. Ling, S. Wee, C. Wei, and Y. Zhu Liang, "Linear sparse array synthesis via convex optimization," in Circuits and Systems (ISCAS), Proceedings of 2010 IEEE International Symposium on, 2010, pp. 4233-4236". Third, the present approach does not add an $l^2$ penalty on the weights to protect against large gains, as opposed to "[11] C. Ling, S. Wee, C. Wei, and Y. Zhu Liang, "Linear sparse array synthesis via convex optimization," in Circuits and Systems (ISCAS), Proceedings of 2010 IEEE International Symposium on, 2010, pp. 4233-4236". Instead, after optimizing over a large set of sensors with a $l^1$ penalty, the present approach selects the sensor locations with the largest weight values across frequencies and then re-optimizes over this subset of locations. During the re-optimization, the present approach excludes the $l^1$ penalty.

One difference between the Lebret and Boyd reference and aspects of the present invention is that Lebret and Boyd generate one set of weights for broadband spectrum signals, while in accordance with an aspect of the present invention a set of weights is determined for at least 2 different frequencies in broadband spectrum signals. The worked out illustrative example that is provided herein generates 4 sets of weights, each set related to a specific frequency.

Lebret finds a matrix of weights for the wideband case that has N×L elements where N is the number of microphones and L is the number of time samples (taps) of the filter. This matrix of weights is the same for all frequencies and minimizes the maximum gain of interferences at different frequencies and locations (see for instance equation 11 in http://pdf.aminer.org/000/343/959/uniform_approach_for_solving_some_classical_problems on_a_linear.pdf) while constraining the maximum absolute value of the weights. In contrast, the methods and systems provided herein in accordance with one or more aspects of the present invention, find weights for each microphone and each frequency. Even if the problem dealt with herein would be reduced to a single frequency case, Lebret would still use multiple weights for different time samples at every microphone while a solution herein would use a single weight for this microphone.

One of ordinary skill would recognize that also more or fewer sets of weights can be determined in a manner as provided herein, with fewer or with more frequencies and each frequency being associated with its particular set of weights. A maximum number of frequencies that is useful is determined by the power of the computer that has to process data. Also, there is a point where additional frequencies do not contribute significantly to a better performance of target detection or analysis.

Thus, in accordance with an aspect of the present invention, the minimum number of frequencies for which a set of microphone or sensor weights is determined is 2.

In accordance with an aspect of the present invention, a single set of sensor weights is determined for only one specific frequency using an optimization method provided herein.

Grid-based Beamforming

Brandstein and Ward modeled an acoustic enclosure as a rectangular grid of point sources that included reverberations by allowing for sources to lie outside the room as described in "[4] M. S. Brandstein and D. B. Ward, "Cell-based beamforming (ce-babe) for speech acquisition with microphone arrays," Speech and Audio Processing, IEEE Transactions on, vol. 8, no. 6, pp. 738-743, 2000" which is incorporated herein by reference, an idea drawn from the "image" model where reflections of sources off of walls are modeled as virtual sources lying outside the room as described in "[12] J. B. Allen and D. A. Berkley, "Image method for efficiently simulating small-room acoustics," J. Acoust. Soc. Am, vol. 65, no. 4, pp. 943-950, 1979" which is incorporated herein by reference. Grids were labeled either as sources or interferences based on prior knowledge. Sensor weights were calculated to maximize the optimization criterion given by the ratio between source gains and interference gains.

Compressive Sampling

The widespread compressive sampling problem as described in "[13] R. G. Baraniuk, E. Candes, R. Nowak, and M. Vetterli, "Compressive sampling," IEEE Signal Processing Magazine, vol. 25, no. 2, pp. 12-13, 2008" and "[14] E. J. Candes and M. Wakin, "An introduction to compressive sampling," IEEE Signal Processing Magazine, vol. 25, no. 2, pp. 21-30, 2008," which are both incorporated herein by reference, is to minimize the $l^0$ pseudo-norm of a vector x subject to a linear constraint Ax=b (in the absence of noise), or an inequality $\|Ax-b\|_p \leq \epsilon$ (in the presence of noise). Using Lagrange multipliers this problem becomes:

$$\min_x \|Ax-b\|_p + \lambda \|x\|_0 \tag{29}$$

Problem (27), in the single frequency case (F=1), can be brought to this form if the additional assumption is made that a specific sensor is active. For simplicity of notation assume it is known that $w_N(f_i) \neq 0$. Then for $W_N$ from the linear constraint $\langle w, \overline{H}_0 \rangle = 1$ is solved and substituted back into Hw. Denoting $\tilde{w}$ the N−1 vector of the first N−1 components of w, and A the L×(N−1) matrix of entries $$A_{l,n} = H_{l,n} \frac{H_{0,n} H_{l,n}}{H_{0,N}}$$

and b the L vector $$b_l = \frac{H_{l,N}}{H_{0,N}}; \tag{27}$$

becomes:

$$\min_{\|\tilde{w}\|_0 \leq D-1} \|A\tilde{w} - b\|_\infty \tag{30}$$

which turns into a problem similar in form to (29):

$$\min_{\tilde{w}} \|A\tilde{w} - b\|_\infty + \lambda \|\tilde{w}\|_0 \tag{31}$$

In the multi-frequency case, A, b, and $\overline{w}$ are all frequency dependent.

In (29), the 0 quasi-norm becomes the mixed-norm ($\infty$, 0), where ($\infty$) is the maximum across frequencies and (0) is the number of non-zeros among these maximums. In (30), the $\infty$-norm becomes the mixed-norm (1, $\infty$) norm, where (1) is the summation across frequencies and ($\infty$) is the maximum of across this resulting sum.

Greedy Selection

In "[15] Alexander Bertrand and Marc Moonen, "Efficient sensor subset selection and link failure response for linear mmse signal estimation in wireless sensor networks," in Proc. of the European signal processing conference (EU-SIPCO), 2010, pp. 1092-1096", Bertrand and Moonen propose two algorithms, greedy addition and greedy deletion, to select a subset of sensors.

In greedy addition, they choose D subsets of sensors out of N possible sensors by running D trials. At the n-th trial (n=1, 2, . . . , D), N−n+1 individual candidate sensors are tested by adding each candidate sensor to the previously selected n−1 sensors and measuring the n sensors performance. The sensor which produced the most improvement in the objective function when added to the previous n−1 sensors is then added to the selected group of sensors.

In a corresponding fashion, in greedy deletion, they choose D sensors by starting with N sensors and then deleting N−D members one by one. N−D trials are run and during a trial a sensor is deleted if its contribution to the group's performance is least among the other group members. A sensor's contribution to the group performance is measured by how the group performs without the sensor.

Though their objective function of minimizing mean square error in signal estimation is different from the approach provided herein, their greedy approaches provide alternative strategies to choosing a subset of sensors. However, their approach differs from the one provided herein in that it is combinatorial by nature.

Experimental Results

Experiments were conducted by optimizing over a simpler model and then evaluating over a more sophisticated model. The optimization model is as follows: A room size is 10 m by 8 m. A target of interest is located at (3 m, 4 m). There are 1000 possible microphone locations located along the perimeter of the rectangular room. Optimization is conducted over four frequencies of 250, 500, 750, and 1000 Hz. There are 6200 virtual interferences, and a direct path model is used to calculate the transfer functions. These interferences are not placed within 0.5 m of the perimeter of the room or the target.

The evaluation model differs from the optimization model in two ways: There is a denser set of interferences, 620,000, and reflections are included for each of these virtual interferences.

Five types of experiments were conducted to compare the performance of the λ-method.

First, the optimization problem (28) is performed, simultaneously optimizing over the four frequencies. This setup fixes the support of the microphone setup across all 4 frequencies.

Second, the optimization problem (28) is performed again four times, once at each individual frequency. The support of the chosen microphones are then allowed to vary over frequencies.

Third, the set of sensors found by the multi-frequency optimization of experiment (27) using simulated annealing is randomly perturbed to see how much better a solution can be found.

Fourth, again simulated annealing is used to perturb the set of microphones found by the single frequency optimization of experiment (28).

Fifth, the performance of the beamformer is tested that maximizes the signal to noise ratio (SNR). This beamformer can be shown to be the set of sensors that lie closest to the target.

The following table shows the worst interference gain in dB for the five setups using the evaluation model.

| f[Hz] | BF | MF λ | SA MF λ | SF λ | SA SF λ |
|---|---|---|---|---|---|
| 250 | 15.6 | 9.2 | 3.9 | −1.19 | −3.1 |
| 500 | 14.5 | 7.6 | 4.3 | 3.3 | 2.1 |
| 750 | 12.5 | 3.4 | 4.1 | −0.9 | −0.2 |
| 1000 | 10.4 | 2.4 | 5.8 | 1.5 | 0.1 |

Figure 11:
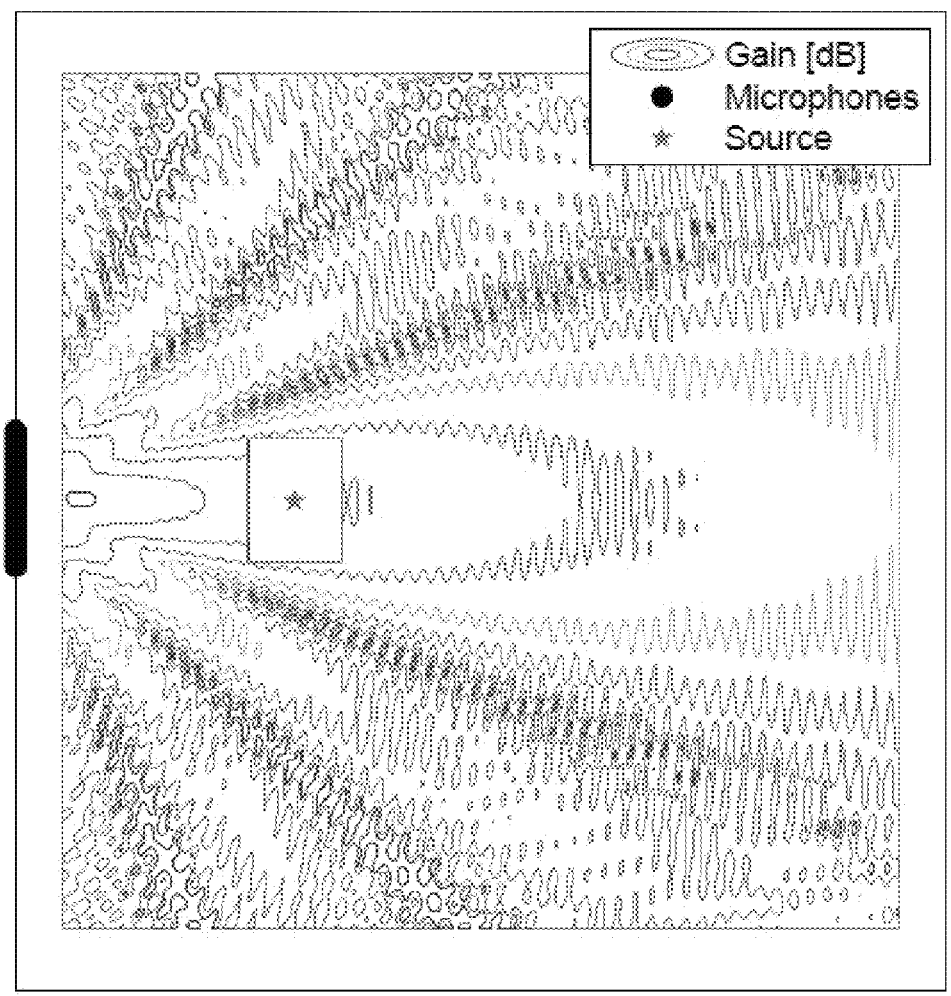
FIG. 11 illustrates a gain map for a classical beamformer.
Figure 12:
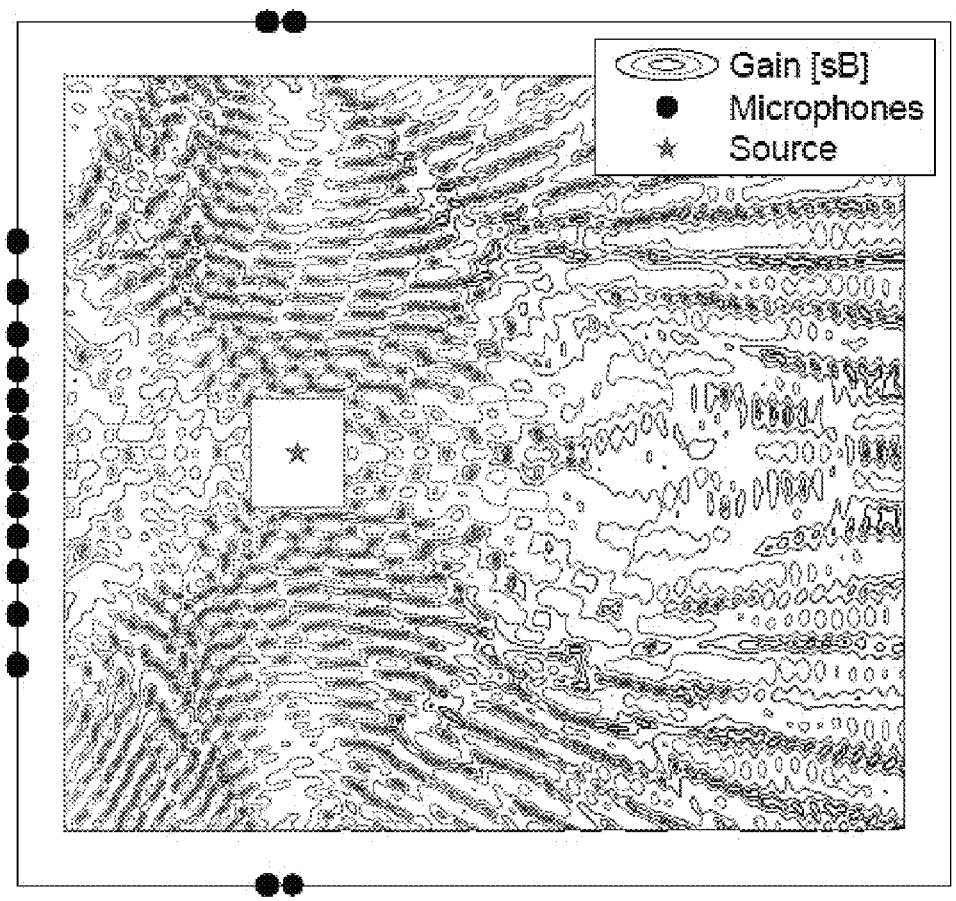
FIG. 12 illustrates a gain map in accordance with various aspects of the present invention.

The results show the multi-frequency λ-processor (column MF λ) provided in accordance with an aspect of the present invention outperforming the beamformer that maximizes SNR (column BF) for every frequency. The single-frequency λ-processor performs better than multi-frequency λ-processor since microphone locations are allowed to vary across frequencies. Simulated annealing (SA) sometimes, but not always, finds better performing solutions when measured with the evaluation model. This is illustrated in FIG. 11 which shows a gain map for a classical beamformer that maximizes SNR at 1000 Hz and FIG. 12 which shows a gain map for a beamformer found by the multi-frequency λ-method provided as an aspect of the present invention, at 1000 Hz.

By algorithm construction, simulated annealing finds a solution at least as good as the initial point when measured on the optimization model. show the beam patterns for both the λ-method and the maximum-SNR beamformer at 1000 Hz along with the placement of the microphones. Results are in dB, with unit target gain (0 dB).

Figure 9:
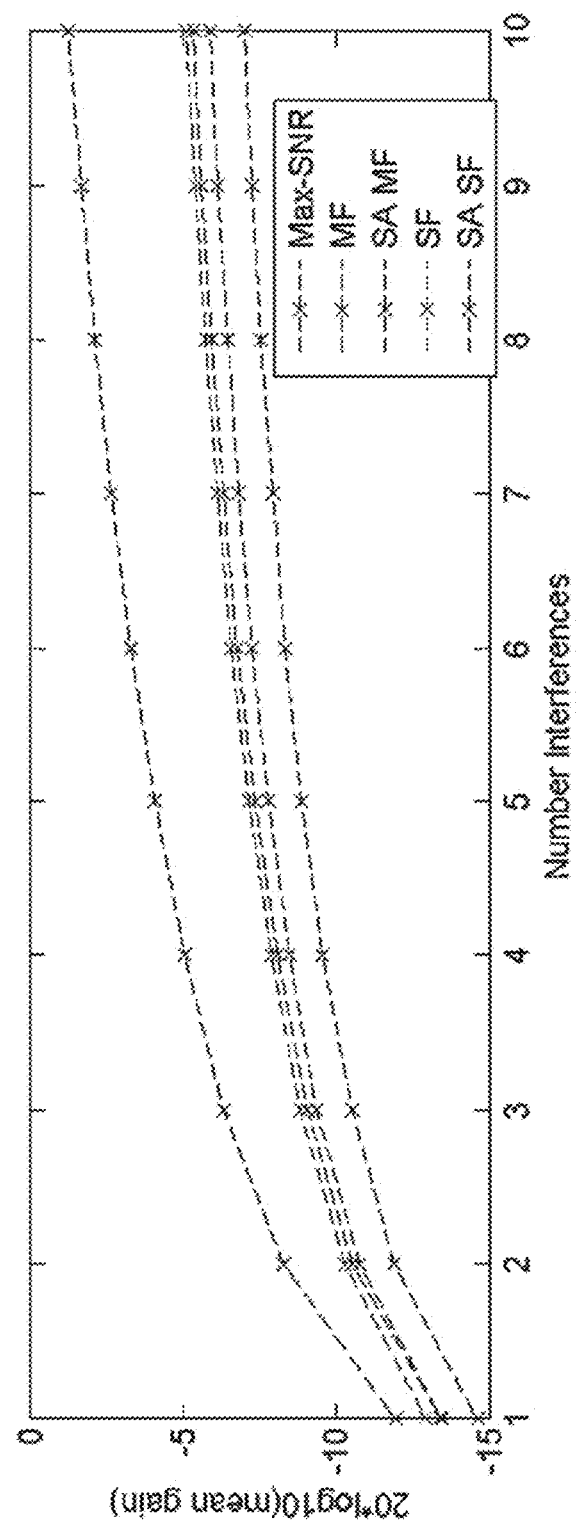
FIG. 9 and FIG. 10 illustrate the effects of varying numbers of interferences in accordance with an aspect of the present invention.
Figure 10:
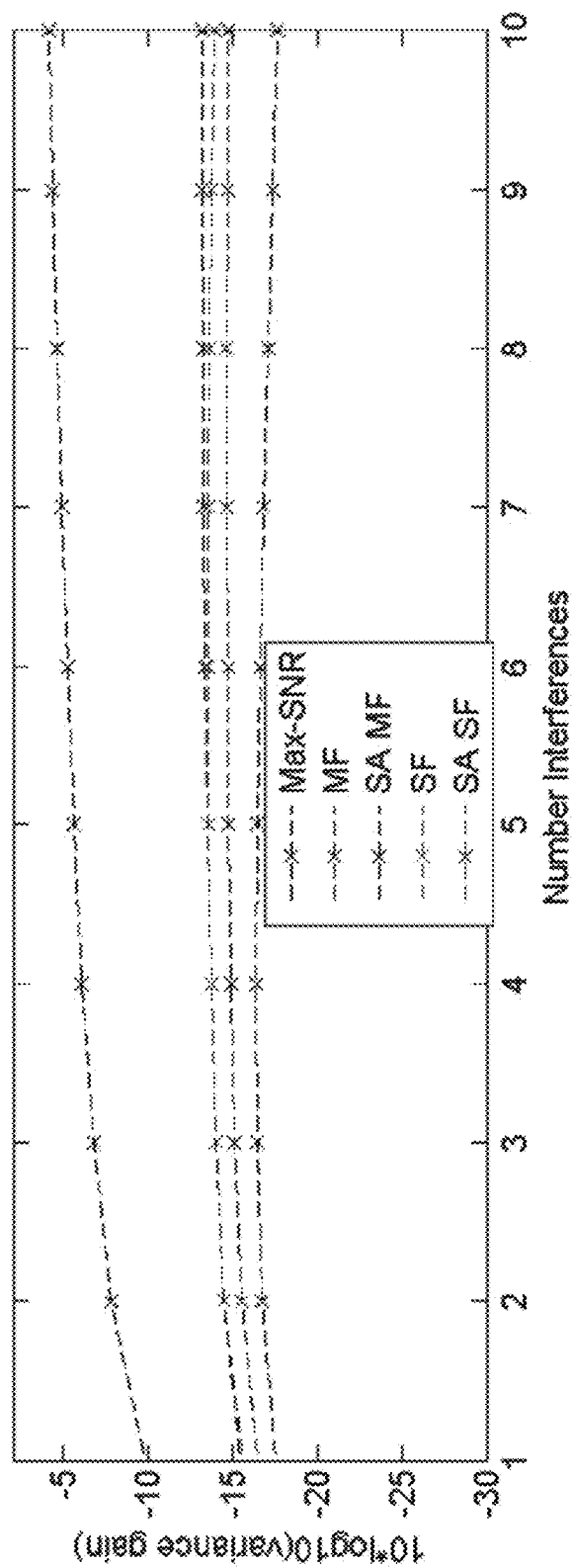
Figure 13:
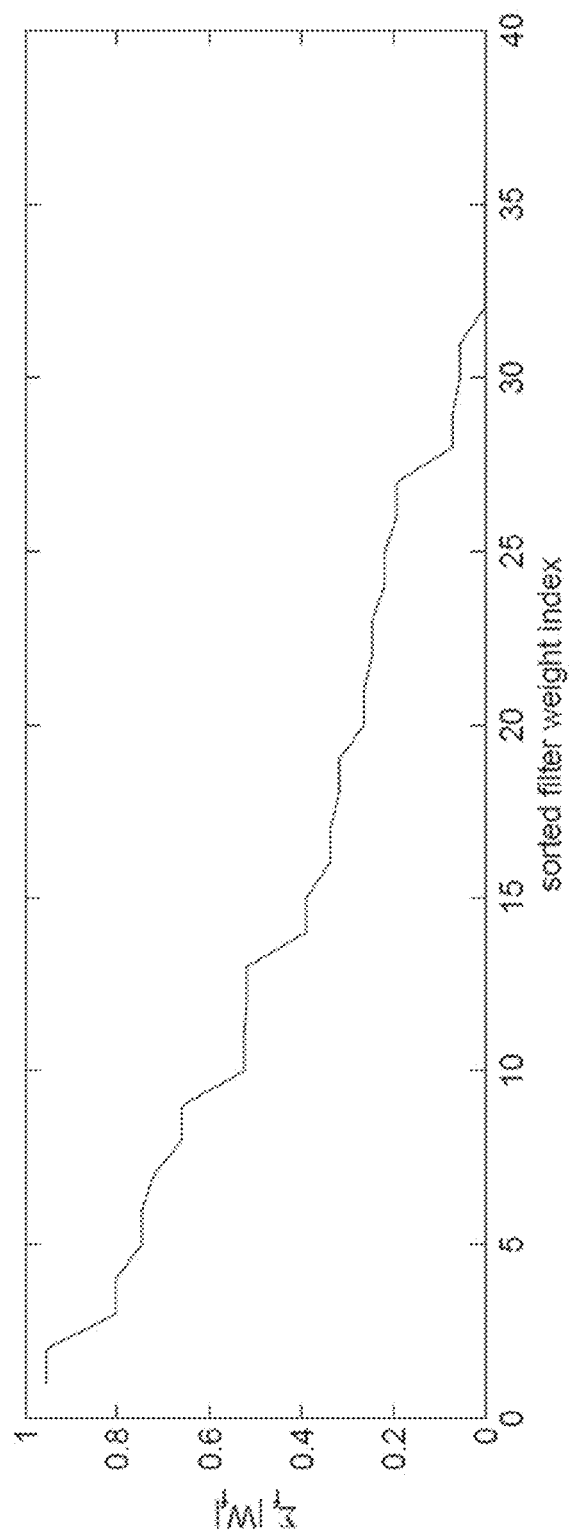
FIG. 13 and FIG. 14 illustrate ordered microphone weights generated in accordance with various aspects of the present invention.
Figure 14:
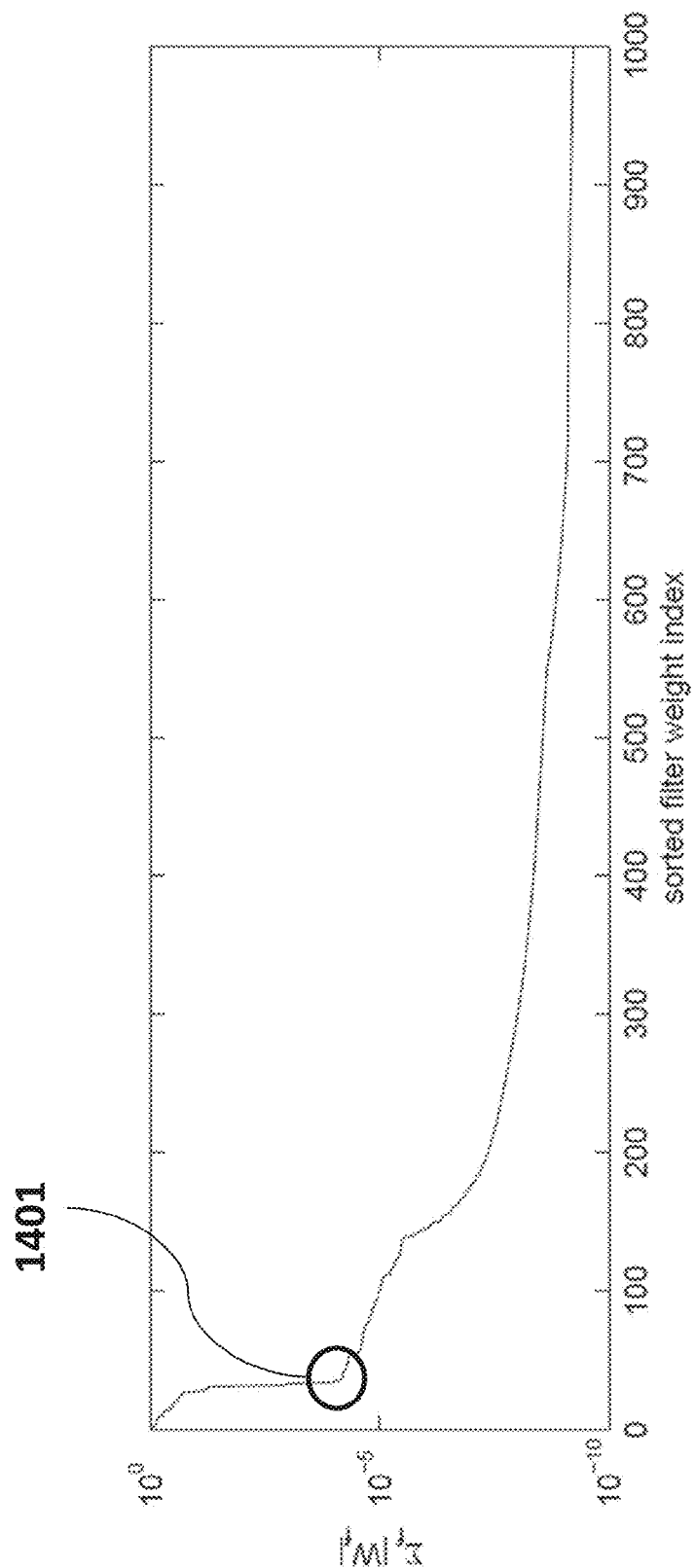

Also compared are the expected value and variance of the maximum gain among a varying number of randomly placed interferences in the surveillance area which is illustrated in FIG. 9 and FIG. 10 which provide in a graph a comparison of mean and variance of maximum gain for varying number of randomly placed interferences at 1000 Hz. Finally, the sharp drop in filter weights produced by the multi-frequency λ-processor is illustrated is illustrated in FIGS. 13 and 14.

In accordance with an aspect of the present invention a very large number of available sensors is utilized by using customized subsets of sensors to monitor specific areas of interest. This selective sampling of sensors then produces reasonable amounts of data to be processed. An equivalent problem to sensor subset selection is sensor spacing.

An optimization criterion applied in accordance with an aspect of the present invention finds sensors that suppresses a large number of interferences across multiple frequencies while monitoring a target location. The subset of selected sensors was allowed to have different weights for different frequencies of interest. It was shown that the multi-frequency LASSO-inspired convex optimization technique of the present invention can find subsets of sensors that give reasonable performance on evaluation models that contain large number of virtual interferences and reflections even though the optimization criterion assumes many fewer virtual interferences and no reflections. If frequencies of interest are uniformly spaced, one can achieve even better performance by allowing the active sensor subset to change over frequencies and then reusing space-time-frequency sampling to recover the signal of interest.

The systems and methods provided herein in accordance with one or more aspects select a subset of sensors from a large set of sensors. These systems and methods circumvent a need to perform a "brute force" N choose D approach. In one embodiment of the present invention the available N sensors which may be microphones, has at least 10,000 sensors or has at least more than 10,000 sensors. However, based on the above explanation, it has become clear that the "large" or "very large" numbers apply also to the number of different sensor combinations that can be selected from the available set of microphones. For instance the number of combinations in selecting 32 microphones from 200 microphones is very large as being impractical.

In accordance with an aspect of the present invention the systems and methods In one embodiment of the present invention, a set of microphones has more than 100 microphones. In another embodiment of the present invention, a set of microphones has more than 199 microphones. In yet another embodiment of the present invention, a set of microphones has more than 499 microphones. In yet another embodiment of the present invention, a set of microphones has more than 999 microphones. In yet another embodiment of the present invention, a set of microphones has more than 4,999 microphones. In yet another embodiment of the present invention, a set of microphones has more than 9,999 microphones. In yet another embodiment of the present invention, a set of microphones has more than 10,000 microphones.

In one embodiment of the present invention, a subset of at least 50% of the set of microphones is selected to calculate an optimized configuration of this subset of microphones. In another embodiment of the present invention, a subset of not more than 50% of the set of microphones is selected to calculate an optimized configuration of such subset of microphones. In yet another embodiment of the present invention, a subset of not more than 40% of the set of microphones is selected to calculate an optimized configuration of the subset of microphones. In yet another embodiment of the present invention, a subset of not more than 30% of the set of microphones is selected to calculate an optimized configuration of the subset of microphones. In yet another embodiment of the present invention, a subset of not more than 20% of the set of microphones is selected to calculate an optimized configuration of the subset of microphones. In yet another embodiment of the present invention, a subset of not more than 10% of the set of microphones is selected to calculate an optimized configuration of the subset of microphones.

In accordance with an aspect of the present invention sensor weights are determined for a subset k of n sensors or microphones, wherein the number of combinations (or n choose k) exceeds $10^{10}$. In accordance with another aspect of the present invention, sensor weights are determined for a subset k of n sensors or microphones, wherein the number of combinations (or n choose k) exceeds $10^8$.

The actual number of sensors or microphones in the subset can be selected in a preferred embodiment of the present invention as being equal to or less than 20% of the total number of microphones; in a more preferred embodiment of the present invention as being equal to or less than 15% of the total number of microphones and in a most preferred embodiment of the present invention a subset D of microphones from a set of N microphones is selected with D either being equal to 10% or being less than 10% of the total number N of microphones.

In accordance with an aspect of the present invention, one can determine ordered weights for one or more frequencies and determine a point (sensor number) where the value of the weight becomes significantly smaller than preceding ordered weights or where the value itself becomes close to zero. This is illustrated in FIG. 14 at point 1401. Weight number 33 (smaller than 0.0001) corresponding to point 1401 is at least two orders of magnitude smaller than weight number 32. This makes 32 sensors a reasonable cut-off point and a reasonable choice to select a subset of 32 sensors.

In accordance with an aspect of the present invention an optimized configuration of a subset of microphones is calculated off-line. In accordance with an aspect of the present invention, an optimized subset configuration for a space with an expected number of targets and a known number of microphones is stored on a memory and is retrieved for use in a situation that is evaluated as corresponding to the conditions of the stored configuration. In accordance with an aspect of the present invention a plurality of different microphone subset configurations is stored on a memory of which one is to be retrieved and applied in a real-life situation that is determined to correspond best to conditions that apply to a stored configuration.

The following references are generally descriptive of the background of the present invention and are hereby incorporated herein by reference: [1] E. Weinstein, K. Steele, A. Agarwal, and J. Glass, LOUD: A 1020-Node Microphone Array and Acoustic Beamformer. International congress on sound and vibration (ICSV), 2007; [2] H. F. Silverman, W. R. Patterson, and J. L. Flanagan. The huge microphone array. Technical report, LEMS, Brown University, 1996; [3] S. Boyd, and L. Vandenberghe. Convex Optimization. Cambridge university press, 2009; [4] M. S. Brandstein, and D. B. Ward. Cell-Based Beamforming (CE-BABE) for Speech Acquisition with Microphone Arrays. Transactions on speech and audio processing, vol 8, no 6, pp. 738-743, 2000; [5] J. Li, Y. Xie, P. Stoica, X. Zheng, and J. Ward. Beampattern Synthesis via a Matrix Approach for Signal Power Estimation. Transactions on signal processing, vol. 55, no 12, pp. 5643-5657, 2007; [6] H. Lebret, and S. Boyd. Antenna Array Pattern Synthesis via Convex Optimization. Transactions on signal processing, vol 45, no 3, pp. 526-532, 1997; [7] R. Tibshirani, "Regression shrinkage and selection via the lasso," Journal of the Royal Statistical Society (Series B), vol. 58, pp. 267-288, 1996; [8] E. J. Candes and Y. Plan, "Near-ideal model selection by l1 minimization," Annals of Statistics, vol. 37, no. 5A, pp. 2145-2177, 2009; [9] S. Kirkpatrick and M P Vecchi, "Optimization by simulated annealing," science, vol. 220, no. 4598, pp. 671-680, 1983; [10] M. S. Lobo, L. Vandenberghe, S. Boyd, and H. Lebret, "Applications of second-order cone programming," Linear algebra and its applications, vol. 284, no. 1, pp. 193-228, 1998; [11] C. Ling, S. Wee, C. Wei, and Y. Zhu Liang, "Linear sparse array synthesis via convex optimization," in Circuits and Systems (ISCAS), Proceedings of 2010 IEEE International Symposium on, 2010, pp. 4233-4236; [12] J. B. Allen and D. A. Berkley, "Image method for efficiently simulating small-room acoustics," J. Acoust. Soc. Am, vol. 65, no. 4, pp. 943-950, 1979; [13] R. G. Baraniuk, E. Candes, R. Nowak, and M. Vetterli, "Compressive sampling," IEEE Signal Processing Magazine, vol. 25, no. 2, pp. 12-13, 2008; [14] E. J. Candes and M. Wakin, "An introduction to compressive sampling," IEEE Signal Processing Magazine, vol. 25, no. 2, pp. 21-30, 2008; and [15] Alexander Bertrand and Marc Moonen, "Efficient sensor subset selection and link failure response for linear mmse signal estimation in wireless sensor networks," in Proc. of the European signal processing conference (EUSIPCO), 2010, pp. 1092-1096.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims.

The invention claimed is:

1. A method for monitoring an acoustic target in a target location in a space monitored by N microphones, the method comprising:
   providing a number D equal to or greater than 2 and smaller than N to a processor;
   providing a number of L locations in the space, wherein each location in the L locations is treated by a processor as an interference source; and
   determining by the processor a set of D microphones from the set of N microphones, the determining including:
      minimizing a maximum interference gain relative to the target location and the L interference locations over at least 2 different frequencies expressed in microphone weights for all N microphones; and
      performing a convex optimization of the microphone weights for all N microphones over an $l^1$ penalty to determine a set of D microphone weights not equal to zero for each of the at least 2 frequencies.

2. The method of claim 1, wherein the set of D microphones is applied to each of the at least 2 frequencies.

3. The method of claim 1, wherein the microphones are sampled selectively over the space-frequency domain and at least two different sets of D microphones are determined.

4. The method of claim 1, wherein the $l^1$ penalty includes applying a Lagrange multiplier in an $l^1$ norm of the microphone weights of the N microphones.

5. The method of claim 4, wherein an expression is evaluated that includes a transfer function for the at least 2 frequencies between each of the N sensors and each of the L interferences and the $l^1$ penalty with a value of the Lagrange multiplier to determine a first set of microphone weights.

6. The method of claim 5, wherein the expression is evaluated for different values of the Lagrange multiplier until the first set of microphone weights has D non-zero sensor weights and (N-D) microphone weights in the first set of microphone weights are at least a factor 10 smaller than a $D^{th}$ microphone weight.

7. The method of claim 6, wherein a final set of microphone weights is determined from the first set of microphone weights by debiasing the expression by setting the value of the Lagrange multiplier to zero.

8. The method of claim 5, wherein the expression is provided by:

$$\min_{(w_n(f_i))_{i=1,n=1}^{F,N}} \max_{1 \leq l \leq L} \sum_{i=1}^{F} \left| \sum_{n=1}^{N} H_{ln}(f_i) w_n(f_i) \right| + \lambda \sum_{n=1}^{N} \max_{1 \leq i \leq F} |w_n(f_i)|$$

subject to:

$$\sum_{n=1}^{N} H_{0n}(f_i) w_n(f_i) = 1 \text{ for } i = 1, 2, \ldots, F,$$

wherein
i is an index of one of F frequencies,
n is an index of one of N microphones,
l is an index of one of L interferences,
$f_i$ indicates a frequency of index i,
$H_{ln}$ indicates a transfer function between a source with index l and a microphone with index n,
$w_n(f_i)$ indicates a weight of microphone n for frequency $f_i$, and
λ is the Lagrange multiplier.

9. The method of claim 1, wherein a perimeter of the space is surrounded by the set of N microphones.

10. The method of claim 1, further comprising determining microphone weights for a plurality of target locations to determine a strength of a signal in each of the plurality of target locations.

11. A system to monitor an acoustic target in a target location in a space monitored by N microphones, the system comprising:
a memory enabled to store data including instructions;
a processor configured to retrieve and execute instructions from the memory to:
accept a number D equal to or greater than 2 and smaller than N;
accept a number of L locations in the space, wherein each location in the L locations is treated as an interference source;
determine a set of D microphones from the set of N microphones, including:
minimization of a maximum interference gain relative to the target location and the L interference locations over at least 2 different frequencies expressed in microphone weights for all N microphones; and
performance of a convex optimization of the microphone weights for all N microphones over an $1^1$ penalty to determine a set of D microphone weights not equal to zero for each of the at least 2 frequencies.

12. The system of claim 11, wherein the set of D microphones is applied to each of the at least 2 frequencies.

13. The system of claim 11, wherein the processor is configured to sample the microphones selectively over the space-frequency domain and at least two different sets of D microphones are determined.

14. The system of claim 11, wherein the $1^1$ penalty includes application of a Lagrange multiplier in an $1^1$ norm of the microphone weights of the N microphones.

15. The system of claim 14, wherein the processor is configured to evaluate an expression that includes a transfer function for the at least 2 frequencies between each of the N sensors and each of the L interferences and the $1^1$ penalty with a value of the Lagrange multiplier to determine a first set of microphone weights.

16. The system of claim 15, wherein the processor is configured to evaluate the expression for different values of the Lagrange multiplier until the first set of microphone weights has D non-zero sensor weights and (N-D) microphone weights in the first set of microphone weights are at least a factor 10 smaller than a $D^{th}$ microphone weight.

17. The system of claim 16, wherein the processor is configured to determine a final set of microphone weights from the first set of microphone weights by debiasing the expression by setting the value of the Lagrange multiplier to zero.

18. The system of claim 15, wherein the expression is provided by:

$$\min_{(w_n(f_i))_{i=1,n=1}^{F,N}} \max_{1 \leq l \leq L} \sum_{i=1}^{F} \left| \sum_{n=1}^{N} H_{ln}(f_i) w_n(f_i) \right| + \lambda \sum_{n=1}^{N} \max_{1 \leq i \leq F} |w_n(f_i)|$$

subject to:

$$\sum_{n=1}^{N} H_{0n}(f_i) w_n(f_i) = 1 \text{ for } i = 1, 2, \ldots, F,$$

wherein
i is an index of one of F frequencies,
n is an index of one of N microphones,
l is an index of one of L interferences,
$f_i$ indicates a frequency of index i,
$H_{ln}$ indicates a transfer function between a source with index l and a microphone with index n,
$w_n(f_i)$ indicates a weight of microphone n for frequency $f_i$, and
λ is the Lagrange multiplier.

19. The system of claim 11, wherein a perimeter of the space is surrounded by the set of N microphones.

20. The system of claim 11, further comprising the processor configured to determine microphone weights for a plurality of target locations to determine a strength of a signal in each of the plurality of target locations.

* * * * *